US012784070B2

(12) United States Patent
Zhong et al.

(10) Patent No.: US 12,784,070 B2
(45) Date of Patent: Nov. 3, 2026

(54) CUSTOMER SERVICE METHOD, DEVICE, AND STORAGE MEDIUM

(71) Applicant: BOE TECHNOLOGY GROUP CO., LTD., Beijing (CN)

(72) Inventors: Pan Zhong, Beijing (CN); Jingtao Xu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 235 days.

(21) Appl. No.: 18/044,585

(22) PCT Filed: Feb. 25, 2022

(86) PCT No.: PCT/CN2022/078111
§ 371 (c)(1),
(2) Date: Mar. 9, 2023

(87) PCT Pub. No.: WO2023/159525
PCT Pub. Date: Aug. 31, 2023

(65) Prior Publication Data
US 2025/0078104 A1 Mar. 6, 2025

(51) Int. Cl.
*G06Q 10/00* (2026.01)
*G06Q 10/0631* (2023.01)
(Continued)

(52) U.S. Cl.
CPC . *G06Q 30/0205* (2013.01); *G06Q 10/063112* (2013.01)

(58) Field of Classification Search
None
See application file for complete search history.

(56) References Cited

U.S. PATENT DOCUMENTS

2012/0287281 A1* 11/2012 Williams ............... G06Q 30/02 348/148
2014/0379524 A1* 12/2014 Grimaud ................. G06T 13/20 705/26.7
(Continued)

FOREIGN PATENT DOCUMENTS

CN 101901461 A 12/2010
CN 104852908 A 8/2015
(Continued)

OTHER PUBLICATIONS

B. I. Batuwanthudawa and K. P. N. Jayasena, "Real-Time Location based Augmented Reality Advertising Platform," 2020 2nd International Conference on Advancements in Computing (ICAC), Malabe, Sri Lanka, 2020, pp. 174-179, doi: 10.1109/ICAC51239.2020.9357261. (Year: 2020).*
(Continued)

*Primary Examiner* — Matheus Ribeiro Stivaletti
(74) *Attorney, Agent, or Firm* — Dority & Manning, P.A.

(57) ABSTRACT

A customer service method includes: determining an overall image and a partial image of a target customer; determining a group attribute of the target customer according to the overall image, the group attribute being used to characterize a type of a group to which the target customer belongs; determining an individual attribute of the target customer according to the partial image, the individual attribute including at least one of gender, age and customer level; determining a service priority of the target customer and a worker type corresponding to the target customer according to the group attribute and the individual attribute of the target customer; and assigning a worker to the target customer according to the service priority of the target customer and the worker type corresponding to the target customer.

14 Claims, 12 Drawing Sheets

(51) Int. Cl.
*G06Q 30/00* (2023.01)
*G06Q 30/0204* (2023.01)

(56) References Cited

U.S. PATENT DOCUMENTS

| | | | | |
|---|---|---|---|---|
| 2017/0337602 | A1* | 11/2017 | Davis | G06V 40/174 |
| 2018/0114228 | A1* | 4/2018 | Singh | G07G 1/0063 |
| 2019/0205965 | A1* | 7/2019 | Li | G06Q 30/0643 |
| 2021/0166250 | A1* | 6/2021 | Chen | G06Q 30/0201 |
| 2021/0342750 | A1* | 11/2021 | Hiramoto | G06Q 10/02 |
| 2023/0186567 | A1* | 6/2023 | Koh | G06F 30/12 345/419 |

FOREIGN PATENT DOCUMENTS

| | | | | |
|---|---|---|---|---|
| CN | 105160543 | A | 12/2015 | |
| CN | 107590452 | A | 1/2018 | |
| CN | 107679635 | A | 2/2018 | |
| CN | 108764932 | A | 11/2018 | |
| CN | 108830439 | A | 11/2018 | |
| CN | 109978672 | A | 7/2019 | |
| CN | 110135257 | A | 8/2019 | |
| CN | 110443828 | A | 11/2019 | |
| CN | 110689374 | A | 1/2020 | |
| CN | 111476183 | A | 7/2020 | |
| CN | 111563245 | A | 8/2020 | |
| CN | 111611944 | A | 9/2020 | |
| CN | 111666441 | A | 9/2020 | |
| JP | 2017146652 | A | 8/2017 | |
| JP | 2019220159 | A * | 12/2019 | G06Q 30/0252 |

OTHER PUBLICATIONS

PCT International Search Report (w/ English translation) and Written Opinion for corresponding PCT Application No. PCT/CN2022/078111, mailed Sep. 29, 2022, 9 pages.

Chinese Office Action (w/English translation) for corresponding Application No. 202280000320.X, dated Mar. 28, 2026, 20 pages.

* cited by examiner

CUSTOMER SERVICE METHOD, DEVICE, AND STORAGE MEDIUM

CROSS-REFERENCE TO RELATED APPLICATION

This application is a national phase entry under 35 USC 371 of International Patent Application No. PCT/CN2022/078111 filed on Feb. 25, 2022, which is incorporated herein by reference in its entirety.

TECHNICAL FIELD

The present disclosure relates to the field of data processing, and in particular, to a customer service method, a customer service device, and a storage medium.

BACKGROUND

Currently, in order to provide customer service for different customers, in the related art, a general practice is to obtain a face image of a customer, and to detect, based on a face recognition technology, whether there is customer identity information matching the face image of the customer in the database. If there is the customer identity information matching the face image of the customer in the database, a corresponding worker will be assigned to the customer according to the identity information.

SUMMARY

In one aspect, a customer service method is provided. The method includes: determining an overall image and a partial image of a target customer, determining a group attribute of the target customer according to the overall image, the group attribute being used to characterize a type of a group to which the target customer belongs; determining an individual attribute of the target customer according to the partial image, the individual attribute including at least one of gender, age, and customer level; determining a service priority of the target customer and a worker type corresponding to the target customer according to the group attribute of the target customer and the individual attribute of the target customer and assigning a worker to the target customer according to the service priority of the target customer and the worker type corresponding to the target customer.

In some embodiments, the method further includes: sending customer information of the target customer and current location information of the target customer to a service terminal, the service terminal being a terminal used by the worker; determining a first location distance between the worker and the target customer according to an overall image of the worker and the overall image of the target customer; and sending service prompt information to the service terminal in a case where the first location distance is greater than a first preset distance and a duration is greater than a first duration.

In some embodiments, the method further includes: receiving registration information of the target customer, the registration information including the partial image of the target customer and a partial image of a companion of the target customer.

In some embodiments, assigning the worker to the target customer according to the service priority of the target customer and the worker type corresponding to the target customer includes: determining an overall image of the companion according to the partial image of the companion; determining a second location distance between the target customer and the companion according to the overall image of the target customer and the overall image of the companion; and in a case where the second location distance is greater than a second preset distance, assigning the worker to the target customer according to the service priority of the target customer and the worker type corresponding to the target customer.

In some embodiments, assigning the worker to the target customer according to the service priority of the target customer and the worker type corresponding to the target customer includes: determining a target worker group, a type of the target worker group being the worker type corresponding to the target customer, and the target worker group including a plurality of target workers; determining a worker priority of the target worker group according to a worker attribute of the target worker group; and assigning a target worker to the target customer according to the service priority of the target customer and the worker priority of the target worker group.

In some embodiments, determining the overall image and the partial image of the target customer includes: obtaining an image to be detected, the image to be detected including the target customer; determining a first image area in the image to be detected, and a first value and a second value corresponding to the first image area, the first value indicating a probability that the first image area includes the overall image, the second value indicating a probability that the first image area includes the partial image, and the first image area being any area in the image to be detected; determining that the first image area includes the overall image of the target customer in a case where the first value is greater than a first threshold; and determining that the first image area includes the partial image of the target customer in a case where the second value is greater than a second threshold.

In some embodiments, determining the group attribute of the target customer according to the overall image includes: inputting the overall image into a group attribute prediction model to determine probabilities of different group attributes of the target customer; and determining the group attribute of the target customer according to the probabilities of different group attributes of the target customer.

In some embodiments, the different group attributes include at least one of mutually exclusive group attributes and independent group attributes, and determining the group attribute of the target customer according to the probabilities of different group attributes of the target customer includes: in a case where the different group attributes include the mutually exclusive group attributes, determining that the group attribute of the target customer includes a first mutually exclusive group attribute, the first mutually exclusive group attribute being a group attribute with a highest probability in the mutually exclusive group attributes; and in a case where the different group attributes include the independent group attributes, determining that the group attribute of the target customer includes a first independent group attribute, the first independent group attribute being a group attribute whose probability is greater than an attribute probability threshold in the independent group attributes.

In some embodiments, determining the individual attribute of the target customer according to the partial image includes: inputting the partial image into an individual attribute prediction model to determine a gender probability corresponding to each gender of the target customer and an age probability corresponding to each age of the target customer, determining that the gender of the target customer is a gender with a highest gender probability; and determining that the age of the target customer is an age with a highest age probability.

In some embodiments, determining the individual attribute of the target customer according to the partial image includes: detecting whether the target customer exists in a user database according to the partial image of the target customer; and obtaining the customer level of the target customer in a case where the target customer exists in the user database.

In some embodiments, the method further includes: obtaining basic information of the target customer in a case where the target customer exists in the user database; sending the basic information of the target customer to a service terminal, the service terminal being a terminal used by the worker; obtaining historical services of the target customer in a case where the target customer authorizes query of historical services; and sending the historical services of the target customer to the service terminal.

In some embodiments, determining the service priority of the target customer according to the group attribute of the target customer and the individual attribute of the target customer includes: determining an attribute factor of the target customer according to the group attribute and the individual attribute, the attribute factor being used to indicate a degree of influence of an attribute of the target customer on the service priority; obtaining queue information of the target customer, and determining a queue factor according to the queue information, the queue factor being used to indicate a degree of influence of the queue information of the target customer on the service priority; obtaining a reservation service of the target customer, and determining a service factor according to the reservation service, the service factor being used to indicate a degree of influence of the reservation service of the target customer on the service priority; and determining the service priority of the target customer according to the attribute factor, the queue factor, and the service factor.

In some embodiments, the method further includes: determining a plurality of overall images of the target customer at different moments among images acquired by a plurality of image acquisition devices; and determining a route trajectory of the target customer according to location information of the plurality of overall images.

In some embodiments, the method further includes: determining a dwell time of the target customer in at least one specific area according to the route trajectory of the target customer, the at least one specific area corresponding to at least one service; determining that a service concerned by the target customer is a service corresponding to a specific area with a longest dwell time; and sending service information of the concerned service to a service terminal, the service terminal being a terminal used by the worker.

In yet another aspect, a non-transitory computer-readable storage medium is provided. The computer readable storage medium stores instructions that, when executed on a computer, cause the computer to perform the customer service method according to any one of the above embodiments.

In some embodiments, the instructions also cause the computer to perform: sending customer information of the target customer and current location information of the target customer to a service terminal, the service terminal being a terminal used by the worker, determining a first location distance between the worker and the target customer according to an overall image of the worker and the overall image of the target customer, and sending service prompt information to the service terminal in a case where the first location distance is greater than a first preset distance and a duration is greater than a first duration.

In yet another aspect, a computer program product is provided. The computer program product includes computer program instructions that, when executed on a computer, cause the computer to perform the customer service method according to any one of the above embodiments.

In yet another aspect, a customer service device is provided. The customer service device includes a processor and a memory. The memory is coupled to the processor and is used to store a computer program or instructions, and the processor is used to run the computer program or instructions to implement the customer service method according to any one of the above embodiments.

In some embodiments, the processor is further used to implement: sending customer information of the target customer and current location information of the target customer to a service terminal, the service terminal being a terminal used by the worker; determining a first location distance between the worker and the target customer according to an overall image of the worker and the overall image of the target customer; and sending service prompt information to the service terminal in a case where the first location distance is greater than a first preset distance and a duration is greater than a first duration.

In the present disclosure, a name of the customer service device does not constitute a limitation on the device or a functional module, and in actual implementation, the device or functional module may appear by other names. As long as the function of the device or functional module is similar to that in the present disclosure, such device or functional module falls within the scope of the claims of the present disclosure and their equivalents.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, but are not limitations on an actual size of a product, an actual process of a method and an actual timing of a signal involved in the embodiments of the present disclosure.

DETAILED DESCRIPTION

Figure 1:
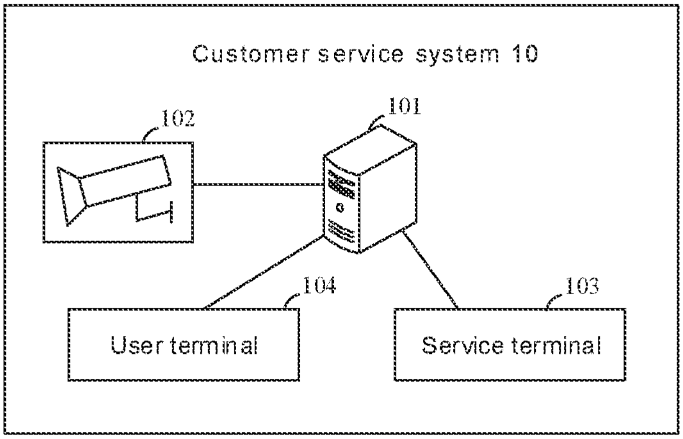
FIG. 1 is a structural diagram of a customer service system, in accordance with some embodiments.

Technical solutions in some embodiments of the present disclosure will be described clearly and completely with reference to the accompanying drawings.

Obviously, the described embodiments are merely some but not all of embodiments of the present disclosure. All other embodiments made on the basis of the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" in the description and the claims are construed as an open and inclusive meaning "inclusive, but not limited to". In the description, terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Below, terms such as "first" and "second" are only used for a purpose of description, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, term "a/the plurality of" means two or more unless otherwise specified.

In the description of some embodiments, terms "coupled", "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other but still cooperate or interact with each other. The embodiments disclosed herein are not necessarily limited to the content herein.

"At least one of A, B, and C" has the same meaning as "at least one of A, B, or C", and they both include the following combinations of A, B, and C: only A, only B, only C, combination of A and B, combination of A and C, combination of B and C, and combination of A, B and C.

The phrase "A and/or B" includes the following three combinations: only A, only B, and a combination of A and B.

As used herein, the term "if", depending on the context, is optionally construed as "when", "in a case where", "in response to determining", or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phrase "applicable to" or "configured to" as used herein indicates an open and inclusive expression, which does not exclude devices that are applicable to or configured to perform additional tasks or steps.

In addition, the phrase "based on" as used herein is meant to be open and inclusive, since a process, step, calculation or other action that is "based on" one or more of the stated conditions or values may, in practice, be based on additional conditions or values beyond those stated.

The term such as "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The terms involved in the embodiments of the present disclosure will be explained below to facilitate understanding of the reader.

(1) Pedestrian Re-Identification (ReID)

The ReID refers to a technology for detecting a specific pedestrian in image or video stream data through a computer vision technology. The ReID is generally used to determine a pedestrian image from image information acquired by at least one image acquisition device (i.e., a cross-device), so as to detect or track the target.

(2) Neural Networks (NNs)

The NNs are also called artificial neural networks (ANNs), which is a mathematical model algorithm that mimics behavioral characteristics of animal neural networks to perform distributed parallel information processing. The NNs include a deep learning network, such as a convolutional neural network (CNN), a residual network (ResNet), or a long short-term memory (LSTM) network.

(3) Intersection Over Union (IoU)

The IoU refers to a ratio of an intersection area of two image areas to a union area of the two image areas, and is generally used to detect a relationship between the two image areas. For example, by calculating the IoU of a predicted image area and an actual image area, an accuracy of a prediction may be determined.

(4) L1 Norm

The L1 norm is also referred to as the Manhattan distance, and is used for indicating the length of the vector space or the length of the vector in the matrix. L1 regularization is generally applied to a loss function in a machine learning algorithm to predict or classify target customers.

Generally, in order to provide respective customer services for different customers, a general practice is to obtain a face image of a customer, and to detect, based on the face recognition technology, whether there is customer identity information matching the face image of the customer in the database. If there is matching customer identity information in the database, a corresponding worker will be assigned to the customer according to the identity information. However, this solution requires that relevant information of the customer is stored in the database in advance. As a result, it cannot be applied to customers not registered in the database, resulting in a poor customer service effect.

In view of the above, embodiments of the present disclosure provides a customer service method, in which a group attribute and an individual attribute of a target customer are determined based on an overall image and a partial image of the target customer, and a worker is assigned to the target customer according to two dimensions of the group attribute and the individual attribute. Therefore, the application range of the customer service method provided in the embodiments of the present disclosure is wider. In the meantime, the accuracy and the smart level of providing services for the target customer can be improved, and the user experience of the target customer is ensured.

Implementations of the embodiments of the present disclosure will be described in detail below with reference to the accompanying drawings.

FIG. 1 is a structural diagram of a customer service system 10 according to some embodiments. As shown in FIG. 1, the customer service system 10 includes customer service device(s) 101, image acquisition device(s) 102, service terminal(s) 103, and user terminal(s) 104.

It will be noted that, in the embodiments of the present disclosure, the number of the customer service device(s) 101, the number of the image acquisition device(s) 102, the number of the service terminal(s) 103, and the number of the user terminal(s) 104 may be one or more. For ease of understanding, only one customer service device 101, one image acquisition device 102, one service terminal 103, and one user terminal 104 are shown in FIG. 1.

As shown in FIG. 1, the customer service device 101 is connected to the image acquisition device 102 through a communication link, the customer service device 101 is connected to the service terminal 103 through a communication link, and the customer service device 101 is connected to the user terminal 104 through a communication link. The communication link may be a wired communication link or a wireless communication link, which is not limited in the present disclosure.

The customer service device 101 is configured to determine the overall image and the partial image of the target customer, and determine relevant attributes of the target customer according to the overall image and the partial image of the target customer, so as to assign the worker to the target customer according to the relevant attributes of the target customer.

For example, there may be one or more target customers. In a case where there are a plurality of target customers, the customer service device 101 determines the overall images and the partial images of the plurality of target customers respectively, so as to assign workers to the plurality of target customers.

The overall image is an image that characterizes the overall image information of the target customer, and the partial image is an image that characterizes part of the image information of the target customer.

In a possible implementation, the customer service device 101 receives image data sent by the image acquisition device 102, and determines the overall image and the partial image of the target customer according to the image data.

Figure 2:
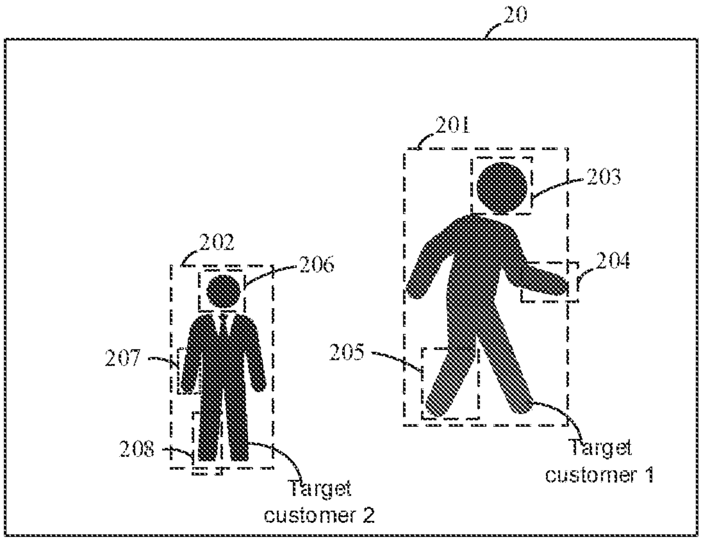
FIG. 2 is an exemplary diagram of image data acquired by an image acquisition device, in accordance with some embodiments.

For example, as shown in FIG. 2, FIG. 2 is an exemplary diagram of image data 20 acquired by the image acquisition device according to some embodiments. The customer service device 101 receives the image data 20 sent by the image acquisition device 102. The customer service device 101 determines, according to the image data 20, that the overall image of target customer 1 is image 201, and the partial images of the target customer 1 are image 203, image 204, and image 205. The customer service device 101 determines, according to the image data 20, that the overall image of target customer 2 is image 202, and the partial images of the target customer 2 are image 206, image 207, and image 208.

It will be noted that the worker may be a service person that provides services to the target customer, or may be a service device that provides services to the target customer. For example, the device is a robot, a terminal device, or an outlet facility.

The customer service device 101 is further configured to send customer information of the target customer to the service terminal 103. Correspondingly, the service terminal 103 receives the customer information sent by the customer service device 101.

For example, the service terminal 103 may be a terminal used by the worker. The customer information includes at least one of related attributes, basic information, historical services, or concerned services of the target customer.

For example, the customer information may include a partial image, a gender and an age of the target customer, and a partial image of a companion.

In a case where the worker is the device that provides services to the target customer, the service terminal 103 may be coupled into the device.

It will be noted that the customer service device 101 may be a server, or the customer service device 101 may be an application installed on the server for providing a customer service function, or the customer service device 101 may be a central processing unit in the server, or the customer service device 101 may be a control module in the server that is configured to perform the customer service method.

Figure 3:
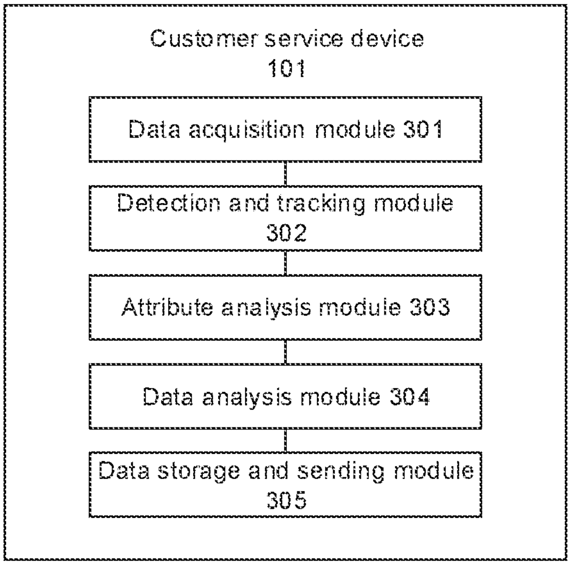
FIG. 3 is a structural diagram of a customer service device, in accordance with some embodiments.

As a possible implementation, as shown in FIG. 3, FIG. 3 is a structural diagram of a customer service device 101 according to some embodiments. The customer service device 101 includes a data acquisition module 301, a detection and tracking module 302, an attribute analysis module 303, a data analysis module 304, and a data storage and sending module 305.

The data acquisition module 301 is configured to acquire image data sent by the image acquisition device 102.

The detection and tracking module 302 is configured to determine the overall image and the partial image of the target customer from the image data. The detection and tracking module 302 is further configured to track the target customer to determine a route trajectory of the target customer.

The attribute analysis module 303 is configured to determine a group attribute of the target customer according to the overall image. The attribute analysis module is further configured to determine an individual attribute of the target customer according to the partial image.

The group attribute is used to characterize a type of a group to which the target customer belongs, and the individual attribute includes at least one of gender, age, and customer level.

The data analysis module 304 is configured to assign the worker to the target customer according to the group attribute of the target customer and the individual attribute of the target customer.

The data storage and sending module 305 is configured to store data to be stored in the execution process of the foregoing modules. The data storage and sending module 305 is further configured to send the customer information of the target customer to the service terminal 103.

The image acquisition device 102 is configured to acquire image data of a target area and transmit the image data to the customer service device 101. Correspondingly, the customer service device 101 receives the image data sent by the image acquisition device 102.

For example, the target area may be a business place where a service is provided. For example, the target area may be a bank, a communication business hall, a clothing store, or a hotel. The target area may also be a presentation place. For example, the target area is a venue such as a museum, a science and technology hall, a calligraphy and painting exhibition hall, or a car showroom. The target area may also be an event venue. For example, the target area is a ball game hall or a car racing hall.

In a possible implementation, the image acquisition device 102 may acquire the image data of the target area in real time, and send the image data to the customer service device 101. The image acquisition device 102 may also acquire the image data of the target area according to a preset frequency, and send the image data to the customer service device 101.

The image acquisition device 102 in the embodiments of the present disclosure is a device that converts image data into an analog signal or a digital signal through a photoreceptor, and may be deployed on land, including indoors or outdoors, handheld or vehicle-mounted. It may also be deployed above a water surface (e.g., deployed on a ship). It may also be deployed in the air (e.g., deployed on an aircraft, balloon, and satellite). For example, the image acquisition device 102 includes a webcam, a video camera, or a camera. The image acquisition device 102 may also be a device having a camera function. For example, the image acquisition device 102 may be a mobile phone, a tablet computer, a notebook computer, a palmtop computer, a wearable device (such as a smart watch, a smart bracelet, a pedometer, or the like), a vehicle-mounted device, a flight device (such as a smart robot, a hot balloon, a drone, an airplane, or the like), or any other device that has the camera function.

For example, the image acquisition device 102 in the embodiments of the present disclosure may also be an infrared imager or a night vision device, which is configured to acquire image data of a dark area.

The service terminal 103 is configured to receive the customer information sent by the customer service device 101. The service terminal 103 is further configured to output the customer information.

For example, the service terminal 103 may output the customer information in a form of image, text, or sound, so that the worker obtains the customer information.

The user terminal 103 is configured to send reservation service information to the customer service device 101. Correspondingly, the customer service device 101 receives the reservation service information sent by the user terminal 103.

The user terminal 103 is further configured to receive a request message sent by the customer service device 101.

The user terminal 103 may be a terminal device used by the target customer or the companion.

The terminal device is also referred to as a user equipment (UE), a mobile station (MS), or a mobile terminal (MT), and is a device that provides voice and/or data connectivity to the user. For example, the terminal includes a handheld device having a wireless connection function, or a vehicle-mounted device having the wireless connection function. Currently, the terminal device may be a mobile phone, a tablet computer, a notebook computer, a palmtop computer, a mobile Internet device (MID), a wearable device (such as a smart watch, a smart bracelet, a pedometer, or the like), a vehicle-mounted device (such as an automobile, a bicycle, an electric vehicle, an airplane, a ship, a train, a high-speed train, or the like), a virtual reality (VR) device, an augmented reality (AR) device, a wireless terminal in industrial control, a smart household device (such as a refrigerator, a television, an air conditioner, an electric meter, or the like), a smart robot, a workshop device, a wireless terminal in a self-driving vehicle, a wireless terminal in a remote medical surgery, a wireless terminal in a smart grid, a wireless terminal in a transportation safety system, a wireless terminal in a smart city, a wireless terminal in a smart home, or a flight device (such as a smart robot, a hot balloon, a drone, an aircraft, or the like). In a possible application scenario of the present disclosure, the terminal device is a terminal device that often works on the ground, such as a vehicle-mounted device. In the embodiments of the present disclosure, for ease of description, a chip deployed in the above device, for example, a system-on-a-chip (SOC), a baseband chip, or any other chip having a communication function may also be referred to as a terminal device.

It will be noted that, for the embodiments of the present disclosure, reference may be made to each other. For example, as for the same or similar steps, reference may be made to each other among the method embodiments, system embodiments and device embodiments, and the present disclosure is not limited thereto.

Figure 4:
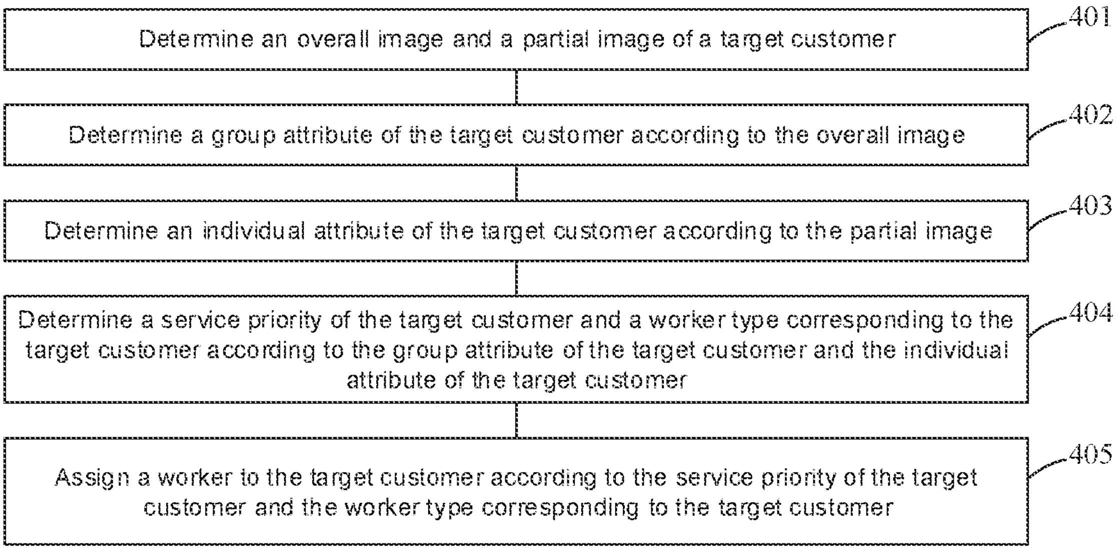
FIG. 4 is a flowchart of a customer service method, in accordance with some embodiments.

FIG. 4 is a flowchart of a customer service method according to some embodiments. As shown in FIG. 4, the method includes the following steps.

In step 401, the customer service device determines an overall image and a partial image of a target customer.

The overall image is an image that characterizes overall image information of the target customer, and the partial image is an image that characterizes part of the image information of the target customer.

For example, the overall image may be an image including a target customer (the image 201 shown in FIG. 2); the partial image may be a face image of the target customer (the image 203 shown in FIG. 2), or may be a hand image of the target customer (the image 204 shown in FIG. 2), or may be a foot image of the target customer (the image 205 shown in FIG. 2). The customer service method provided in the embodiments of the present disclosure is described in detail by taking an example where the partial image is the face image.

In a possible implementation, the customer service device obtains an image of the target area from the image acquisition device, and inputs the image of the target area into a target detection model to obtain the overall image and the partial image of the target customer.

For example, the target detection model may be a neural network model, e.g., a YOLO (you only look once) algorithm model, an SSD (single shot multibox detector) algorithm model, an R-CNN (region CNN) algorithm model, or a Faster R-CNN algorithm model.

There may be one or more target customers. In a case where there are a plurality of target customers, the customer service device determines the overall images and the partial images of the plurality of target customers respectively.

It will be noted that, since there is a certain correlation between the overall image and the partial image of the same target customer (for example, the IoU is greater than a preset threshold), the customer service device may determine that the overall image and the partial image satisfying the correlation relationship correspond to the target customer.

In a possible implementation, the customer service device determines to bind the target customer to the overall image and the partial image according to the correlation relationship between the overall image and the partial image.

For example, as shown in FIG. 2, the customer service device determines that the overall images include the image 201 and the image 202, and the partial images include the image 203 and the image 206. The customer service device determines the IoU of the image 201 and the image 203, the IoU of the image 201 and the image 206, the IoU of the image 202 and the image 203, and the IoU of the image 202 and the image 206. Based on the determined IoUs of the overall images and the partial images, the customer service device determines that the target customer 1 corresponds to the image 201 and the image 203, and the target customer 2 corresponds to the image 202 and the image 206.

In step 402, the customer service device determines a group attribute of the target customer according to the overall image.

The group attribute is used to characterize a type of a group to which the target customer belongs.

For example, the customer service device may divide the customers into groups according to the occupation type. For example, the group attributes include worker, special occupation personnel and other personnel. The group attributes may also include other specific groups, such as pregnant women, people with disabilities, and other people with limited mobility.

In a possible implementation, the customer service device may input the overall image into the group attribute prediction model to obtain the group attribute of the target customer.

For example, the group attribute prediction model may be a neural network model, e.g., an EfficientNet algorithm model or a ResNet algorithm model.

In addition, the customer service device may further obtain an object image associated with the group attribute, and further determine the group attribute of the target customer based on the object image and the overall image.

For example, the customer service device may detect an object image such as a wheelchair or a crutch, calculate an IoU of the object image and the overall image, and determine that the group attribute of the target customer includes people with disabilities in a case where the IoU is greater than the preset threshold.

In a possible implementation, in a case where the group attribute of the target customer is worker, the customer service device may filter the target customers whose group attribute is worker, so as to avoid false detection during detection of the target customer, and improve the accuracy of detection of the target customer.

It will be noted that, due to factors such as changes in lighting, the position and angle of the target customer, and other objects, the overall image determined by the customer service device may be occluded or truncated. The occluded or truncated overall image may affect determining of the group attribute of the target customer by the customer service device. Therefore, the customer service device may obtain a plurality of overall images of the target customer, and select the overall image with good image quality, thereby improving the accuracy of determining the group attribute by the customer service device.

In a possible implementation, before step 402, the customer service device may further determine an occlusion factor and a truncation factor of the overall image based on the overall image, and determine a quality evaluation value of the overall image based on the occlusion factor and the truncation factor.

The occlusion factor is used to characterize an occlusion degree of the overall image, and the truncation factor is used to characterize a truncation degree of the overall image.

For example, the quality evaluation value of the overall image satisfies the following formula 1:

$$Q = a*P_1 + b*P_2 \qquad \text{Formula 1}$$

Where Q is the quality evaluation value of the overall image, $P_1$ is the occlusion factor, $P_2$ is the truncation factor, a is a weight value of the occlusion factor, and b is a weight value of the truncation factor.

Values of a and b may be set according to actual situations, which is not limited in the present disclosure.

If the quality evaluation value of the overall image is greater than a preset quality threshold, it indicates that an image quality of the overall image is poor, and the customer service device removes the overall image.

If the quality evaluation value of the overall image is less than or equal to the preset quality threshold, it indicates that the image quality of the overall image is relatively good, and the customer service device keeps the overall image.

The step 402 may be implemented by the following step: the customer service device determines the group attribute of the target customer according to the overall image satisfying a first preset condition.

The first preset condition is that the quality evaluation value of the overall image is less than or equal to the preset quality threshold.

In step 403, the customer service device determines an individual attribute of the target customer according to the partial image.

The individual attribute is used to characterize individual information of the target customer. For example, the individual attribute includes at least one of gender, age, and customer level.

It will be noted that the partial image can reflect details of the target customer. Therefore, the customer service device can determine the attribute characterizing the individual information of the target customer through the partial image.

Considering an example where the partial image is a face image, the customer service device may perform operations such as face key point detection and face alignment on the face image to obtain a standard face image of the target customer, so as to determine the individual attribute in later steps. As for the specific operation, reference may be made to the related art, and details will not be provided in the present disclosure.

In a possible implementation, the customer service device may input the partial image into an individual attribute prediction model to obtain the individual attribute of the target customer.

For example, the individual attribute prediction model may be a neural network model, e.g., a ShuffleNet algorithm model or a ResNet algorithm model.

In a possible implementation, before step 403, the customer service device may further determine an image quality of the partial image according to the partial image, and remove partial images with poor image quality. As for a specific implementation, reference may be made to the related implementation of removing overall images of poor image quality in step 402, and details are not repeated here.

For example, after determining the individual attribute of the target customer, the customer service device may further perform a correction on the group attribute of the target customer through the individual attribute of the target customer. For example, in a case where the customer service device determines that the gender of the target customer is male, the customer service device may remove the attribute of pregnant woman in the group attributes of the target customer. In this way, the customer service device may further improve the accuracy of determining the attribute of the target customer.

In step 404, the customer service device determines a service priority of the target customer and a worker type corresponding to the target customer according to the group attribute of the target customer and the individual attribute of the target customer.

The service priority is used to indicate a priority order in which the customer service device assigns workers to target customers. According to the group attribute of the target customer and the individual attribute of the target customer, the customer service device may improve the service priority of target customers with limited mobility, such as pregnant women and people with disabilities, so as to ensure the service experience of different user groups.

In a possible implementation, the customer service device may determine the service priority of the target customer based on the group attribute, the individual attribute, the queue information, and the reservation service of the target customer. For details, reference may be made to the subsequent description, and details are not provided here.

The worker may be a service person that provides services for the target customer, or may be a service device that provides services to the target customer. For example, the device is a robot, a terminal device, or an outlet facility.

In addition, the customer service device may also classify the workers according to the group attributes and the individual attributes of the target customers that the workers can serve, so as to determine a plurality of worker types, thereby effectively providing corresponding services for different target customers.

In step 405, the customer service device assigns a worker to the target customer according to the service priority of the target customer and the worker type corresponding to the target customer.

In some embodiments, the customer service device assigns a worker of a corresponding worker type to the target customer according to the priority order corresponding to the service priority.

For example, the customer service device determines that the service priority of the target customer is a high priority, and the worker type is a first worker type. Then, the customer service device preferentially assigns a worker corresponding to the first worker type to the target customer.

In a possible implementation, the customer service device determines a correspondence between the worker type and a customer level of the target customer that the worker can serve. The customer service device assigns the worker of the corresponding worker type to the target customer according to the customer level of the target customer.

In another possible implementation, the customer service device classifies the workers according to their service capability of processing different services, and assigns the worker of the corresponding worker type to the target customer according to the reservation service type of the target customer.

For example, for a complex service, the customer service device assigns, to the target customer, the worker having a strong capability of processing complex services; and for a simple service, the customer service device assigns a self-service device to the target customer.

It will be noted that the customer service device may also determine the corresponding worker type according to the group to which the target customer belongs, and assign the worker to the target customer accordingly.

For example, regarding a group of special occupational personnel or people with limited mobility including pregnant women and people with disabilities that workers can serve, the customer service device classifies the workers according to a related service experience, and assigns corresponding types of workers to such customers, so as to provide better services. The customer service device can also classify workers according to their working efficiency, and assign workers with high working efficiency to young people.

Based on the above technical solution, in the embodiments of the present disclosure, by determining the overall image and the partial image of the target customer, the customer service device determines the group attribute of the target customer according to the overall image, and determines the individual attribute of the target customer according to the partial image. Since the group attribute can characterize the type of the group to which the target customer belongs, and the individual attribute can characterize the individual information of the target customer, the customer service device can assign the worker to the target customer from two dimensions of the group attribute and the individual attribute, thereby improving the accuracy and the smart level of providing services for the target customer and ensuring the user experience of the target customer. In the meantime, the customer service device further determines the service priority of the target customer and the worker type corresponding to the target customer according to the group attribute and the individual attribute of the target customer, and assigns the worker of the corresponding worker type to the target customer according to the priority order of the service priority. In this way, the customer service device may provide optimal services for different target customers in a targeted manner, thereby ensuring the service experience of different target customers.

A process of determining a service state of the worker by the customer service device, after the customer service device assigns the worker to the target customer, is described in detail below.

Figure 5:
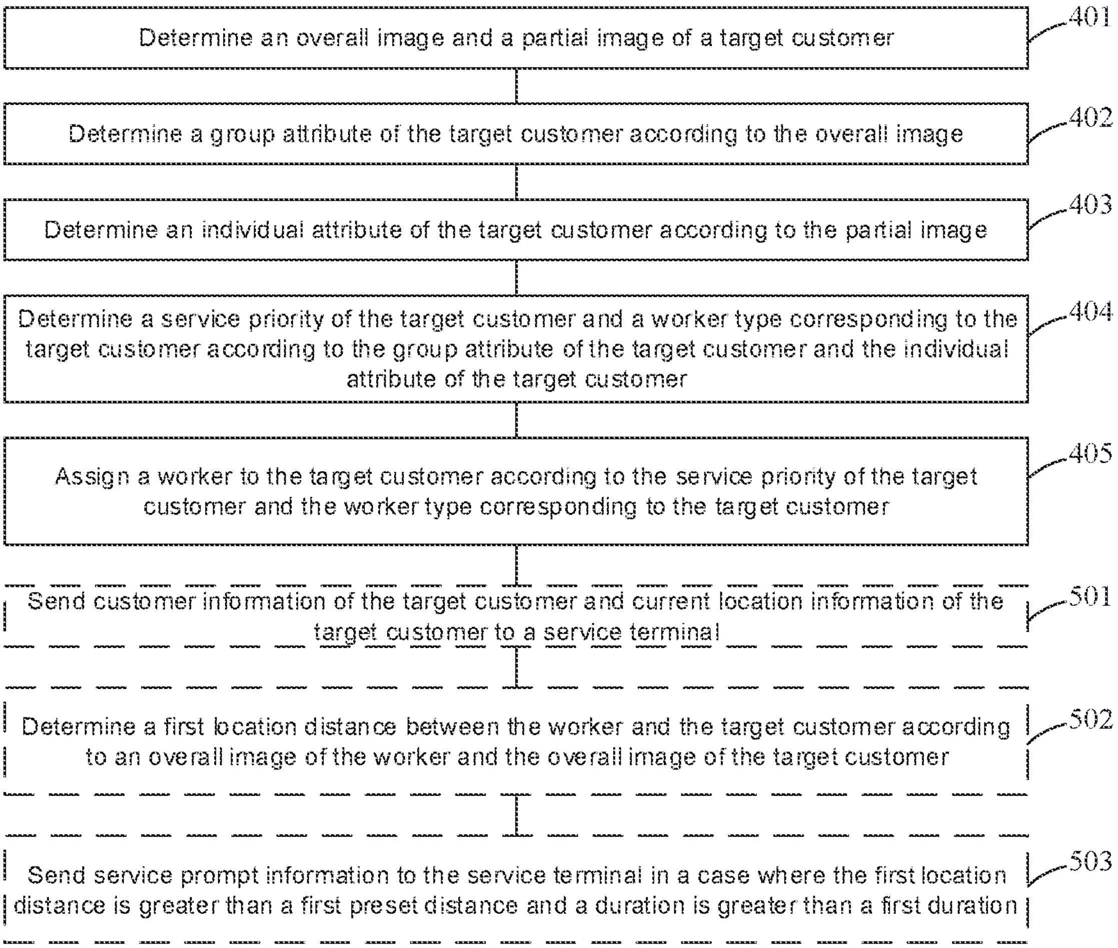
FIG. 5 is a flowchart of another customer service method, in accordance with some embodiments.

As a possible embodiment of the present disclosure, with reference to FIG. 4, as shown in FIG. 5, after step 405, the method further includes the following steps 501 to 503.

In step 501, the customer service device sends customer information of the target customer and current location information of the target customer to the service terminal.

The service terminal is a terminal used by the worker.

It will be noted that after the worker is assigned to the target customer, the customer service device may send the customer information of the target customer and the current location information of the target customer to the service terminal, so that the worker can provide services for the target customer in time.

For example, the customer information may include the partial image, the overall image, the group attribute, the individual attribute, and other information of the target customer.

The location information of the target customer may be determined based on the overall image of the target customer, and as for a specific implementation thereof, reference may be made to the subsequent description, and details are not provided here.

In step 502, the customer service device determines a first location distance between the worker and the target customer according to an overall image of the worker and the overall image of the target customer.

The customer service device may store the overall image and a partial image of the worker in advance, or may obtain the overall image of the worker in the manner in step 401 to step 403.

For example, after acquiring an overall image and a partial image of a first object, the customer service device determines a group attribute of the first object according to the overall image of the first object. In a case where the group attribute of the first object includes worker, the customer service device determines that the first object is a worker. The overall image of the first object is the overall image of the worker.

After determining the overall image of the worker and the overall image of the target customer, the customer service device may map the overall images to a coordinate system corresponding to the target area to obtain location coordinates of the worker and the target customer, so as to determine the first location distance between the worker and the target customer based on the location coordinates.

In step 503, in a case where the first location distance is greater than a first preset distance and a duration is greater than a first duration, the customer service device sends service prompt information to the service terminal.

The service prompt information is used to prompt the worker to provide services for the target customer in time.

The specific values of the first preset distance and the first duration may be set according to actual conditions, which is not limited in the present disclosure.

It will be noted that, the customer service device may determine, according to the distance between the worker and the target customer, whether the worker has reached the side of the target customer. In a case where the distance between the worker and the target customer is greater than the first preset distance, it indicates that the worker hasn't provided services for the target customer. In a case where the duration is greater than the first duration, the customer service device may send service prompt information to the service terminal to prompt the worker to provide services for the target customer in time.

In a possible implementation, after the customer service device sends the service prompt information to the service terminal, the customer service device may determine, according to a preset interval, whether the first location distance is greater than the first preset distance.

In a case where the first location distance is still greater than the first preset distance, the customer service device may send service prompt information to the service terminal again, or reassign a worker to the target customer.

Based on the above technical solution, after assigning the worker to the target customer, the customer service device can send the customer information of the target customer and the current location information of the target customer to the service terminal, so that the worker can reach the side of the target customer in time and provide services for the target customer. In addition, the customer service device can also determine whether the worker is providing services for the target customer based on the location distance between the worker and the target customer, and remind the worker to provide services when the duration is greater than the first duration, so as to ensure the service experience of the target customer.

A process of receiving registration information of the target customer by the customer service device is described in detail below.

Figure 6:
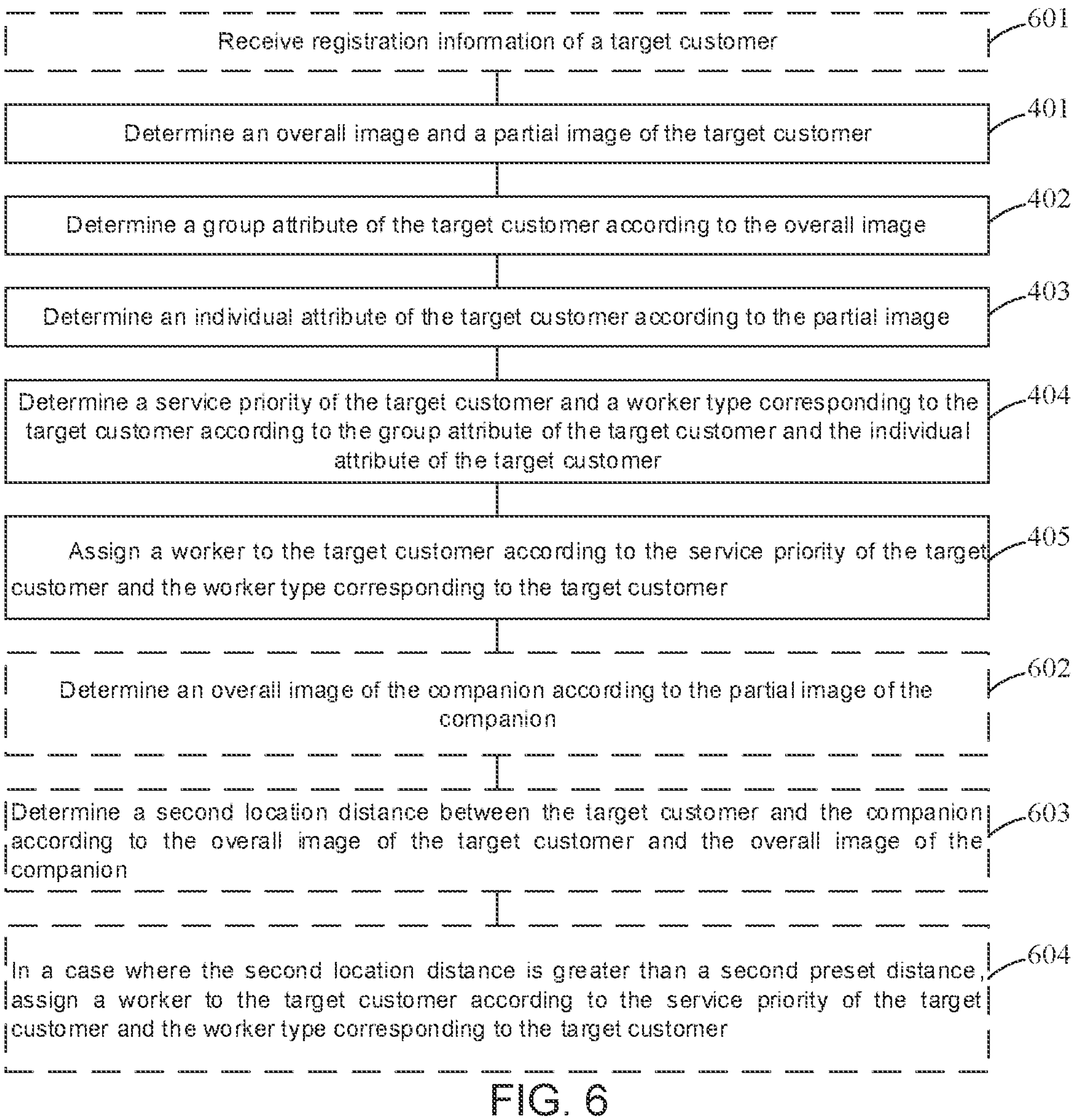
FIG. 6 is a flowchart of yet another customer service method, in accordance with some embodiments.

As a possible embodiment of the present disclosure, with reference to FIG. 4, as shown in FIG. 6, before step 401, the method further includes the following step 601.

In step 601, the customer service device receives registration information of the target customer.

The registration information includes the partial image of the target customer and a partial image of a companion of the target customer.

In a possible implementation, the customer service device may store the obtained partial image of the target customer and partial image of the companion of the target customer in a user database, and set a binding relationship between the target customer and the companion, so as to make it more convenient for the customer service device to obtain the related information between the target customer and the companion in a subsequent step.

As another possible embodiment of the present disclosure, with reference to FIG. 4, as shown in FIG. 6, after step 405, the method further includes the following steps 602 to 604.

In step 602, the customer service device determines an overall image of the companion according to the partial image of the companion.

After determining the overall image and the partial image of the target customer, the customer service device may match the partial image of the target customer to a partial image of each user in the user database.

If the target customer exists in the user database, the customer service device may further detect whether the target customer has a companion bound thereto, so as to obtain the partial image of the companion.

As for a process in which the customer service device matches the partial image of the target customer to the partial image of each user in the user database, reference may be made to the subsequent description, and details are not provided here.

The customer service device may, according to the partial image of the companion, determine an overall image having a correlation relationship (for example, the IoU is greater than the preset threshold) with the partial image among images acquired by the image acquisition device, and use the overall image as the overall image of the companion.

As for a specific implementation, reference may be made to related descriptions in step 401, and details are not repeated here.

In step 603, the customer service device determines a second location distance between the target customer and the companion according to the overall image of the target customer and the overall image of the companion.

A specific manner in which the customer service device determines the second location distance between the target customer and the companion is the same as the implementation manner in which the customer service device determines the first location distance between the worker and the target customer in step 502, and details are not repeated here.

In step 604, in a case where the second location distance is greater than a second preset distance, the customer service device assigns a worker to the target customer according to the service priority of the target customer and the worker type corresponding to the target customer.

The second preset distance may be set according to actual situations, which is not limited in the present disclosure.

It will be noted that, in a case where the second location distance is greater than the second preset distance, it indicates that the companion is not at the side of the target customer, and the customer service device may assign a worker to the target customer in time, so as to provide services for the target customer.

Based on the above technical solution, the customer service device obtains the partial image of the companion of the target customer to determine the second location distance between the target customer and the companion; and in a case where the distance between the target customer and the companion is too large, the customer service device assigns a worker to the target customer in time, thereby ensuring the service experience of the target customer.

The process of assigning the worker to the target customer by the customer service device is described in detail below with reference to the above step 405.

Figure 7:
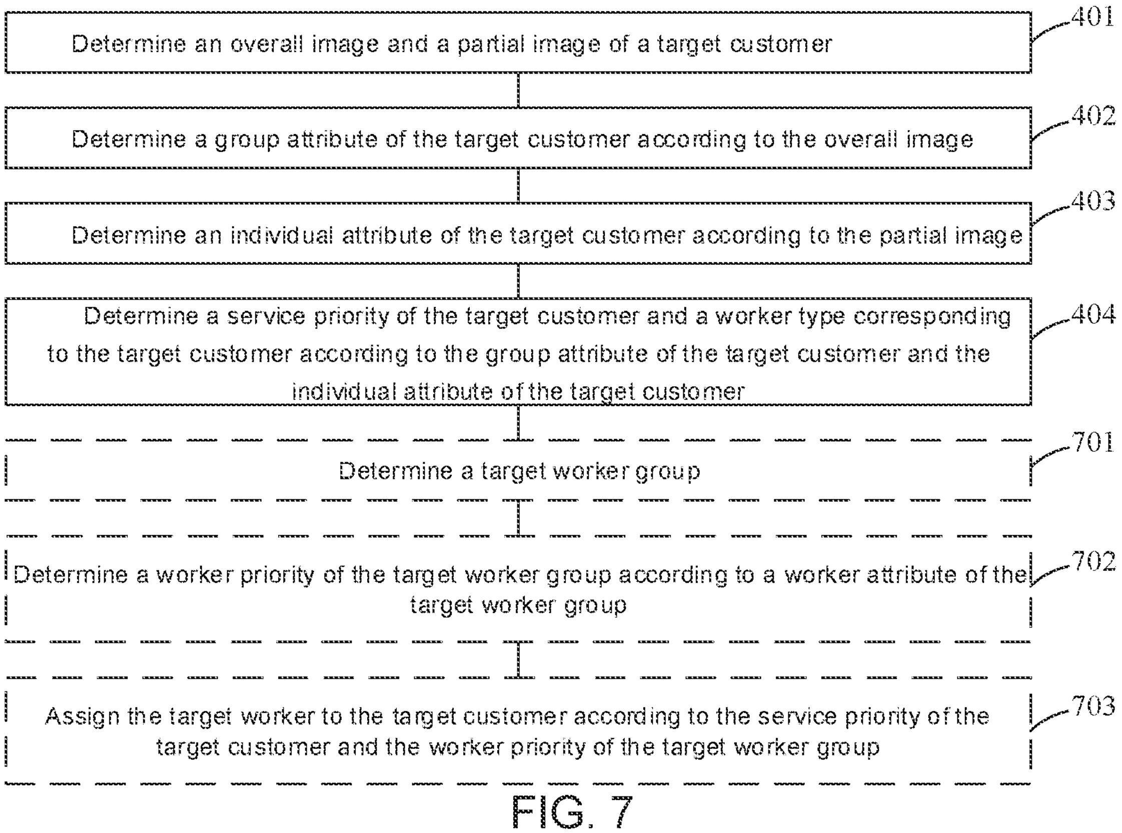
FIG. 7 is a flowchart of yet another customer service method, in accordance with some embodiments.

As a possible embodiment of the present disclosure, with reference to FIG. 4, as shown in FIG. 7, step 405 may be implemented by the following steps 701 to 703.

In step 701, the customer service device determines a target worker group.

A type of the target worker group is the worker type corresponding to the target customer, and the target worker group includes a plurality of target workers.

It will be noted that after the customer service device determines the worker type corresponding to the target customer, the customer service device may determine the target worker group corresponding to the type based on the worker type.

In step 702, the customer service device determines a worker priority of the target worker group according to a worker attribute of the target worker group.

The worker attribute is used to indicate the workload of each target worker in the target worker group. The worker attribute includes at least one of a working duration, a working intensity, and a working frequency. The worker priority is used to indicate an order in which each target worker in the target worker group is assigned.

It will be noted that, the customer service device may determine the worker priority of the target worker group based on the worker attribute of the worker group.

For example, the longer the working duration, the higher the working intensity, and the higher the working frequency, the lower the worker priority of the target worker determined by the customer service device. On the contrary, the shorter the working duration, the lower the working intensity, and the lower the working frequency, the higher the worker priority of the target worker determined by the customer service device.

In a possible implementation, in a case where the target worker is a service device, the customer service device may set the worker priority of the target worker to be a high priority, thereby improving the working efficiency of the service device.

In step 703, the customer service device assigns the target worker to the target customer according to the service priority of the target customer and the worker priority of the target worker group.

For example, the higher the service priority of the target customer, the more preferentially the customer service device assigns a worker to the target customer. The higher the worker priority of a target worker in the target worker group, the more preferentially the customer service device assigns the target worker to the corresponding target customer.

Based on the above technical solution, the customer service device can determine a target worker group of a worker to be assigned, and assign the target worker to the target customer based on the service priority of the target customer and the worker priority of the target worker group. In this way, the customer service device can adjust the working intensity of each worker, thereby avoiding the problem that some workers become too tired due to uneven distribution of work.

A process of determining the overall image and the partial image of the target customer by the customer service device is described in detail below with reference to the above step 401.

Figure 8:
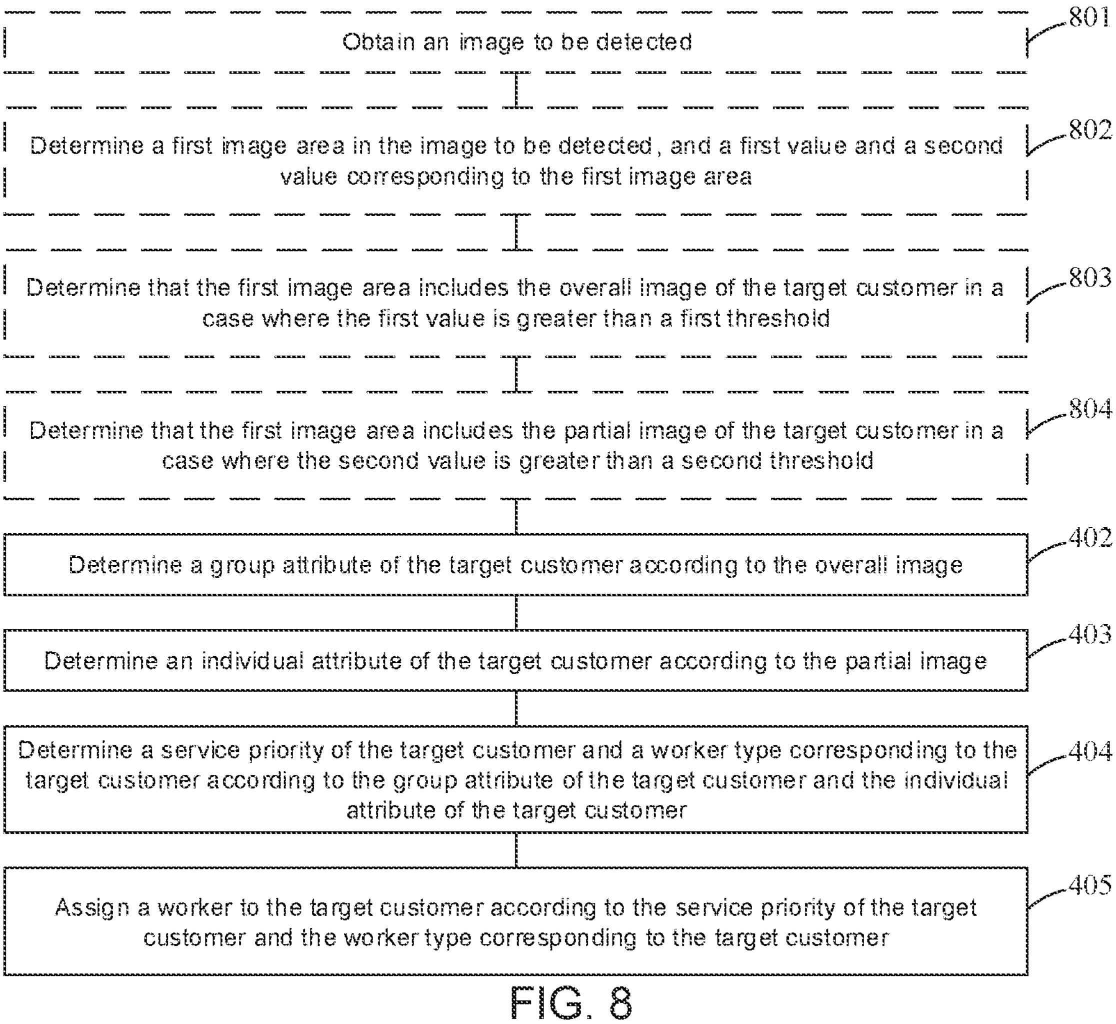
FIG. 8 is a flowchart of yet another customer service method, in accordance with some embodiments.

As a possible embodiment of the present disclosure, with reference to FIG. 4, as shown in FIG. 8, step 401 may be implemented by the following steps 801 to 804.

In step 801, the customer service device obtains an image to be detected.

The image to be detected includes the target customer. The image to be detected is an image of a target area acquired by the image acquisition device. There may be one or more image acquisition devices.

For example, the target area may be a place where a service is provided. For example, the target area may be a bank, a communication business hall, a clothing store, or a hotel. The target area may also be a presentation place. For example, the target area is a venue such as a museum, a science and technology hall, a calligraphy and painting exhibition hall, or a car showroom. The target area may also be an event venue. For example, the target area is a ball game hall or a car racing hall.

In a possible implementation, the customer service device receives the images to be detected sent by one or more image acquisition devices.

In step 802, the customer service device determines a first image area in the image to be detected, and a first value and a second value corresponding to the first image area.

The first value indicates a probability that the first image area includes the overall image. The second value indicates a probability that the first image area includes the partial image. The first image area is any area in the image to be detected.

Figure 9:
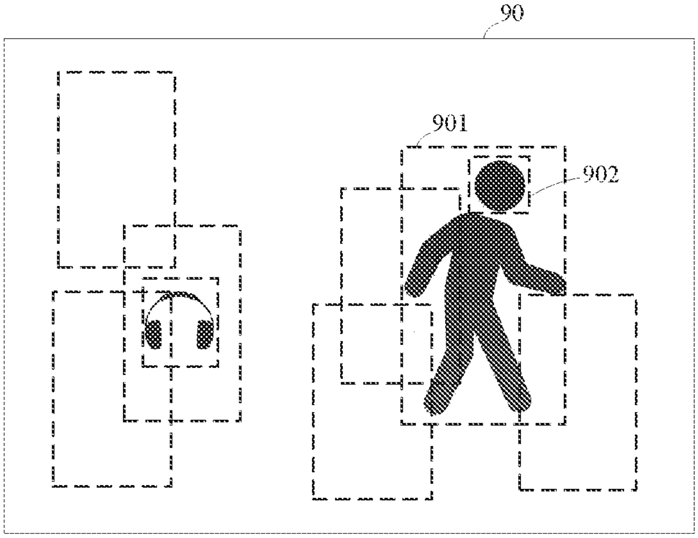
FIG. 9 is an exemplary diagram of an image to be detected, in accordance with some embodiments.

For example, as shown in FIG. 9, FIG. 9 is an exemplary diagram of an image 90 to be detected according to some embodiments. The customer service device determines the first image area (i.e., any dashed box in FIG. 9) from the image 90 to be detected, and the first value and the second value corresponding to the first image area.

In step 803, in a case where the first value is greater than a first threshold, the customer service device determines that the first image area includes the overall image of the target customer.

It will be noted that, the first value indicates a probability that the first image area includes the overall image; and therefore, the greater the first value, the greater the probability that the first image area includes the overall image of the target customer.

In an example where the first threshold is 0.9, if the first value is greater than 0.9, the customer service device determines that an image (such as the image 901 in FIG. 9) included in the first image area is the overall image of the target customer.

In step 804, in a case where the second value is greater than a second threshold, the customer service device determines that the first image area includes the partial image of the target customer.

Similarly, the greater the second value, the greater the probability that the first image area includes the partial image of the target customer.

In an example where the second threshold is 0.9, if the second value is greater than 0.9, the customer service device determines that an image (such as the image 902 in FIG. 9) included in the first image area is the partial image of the target customer.

Based on the above technical solution, the customer service device can obtain the image to be detected, and determine the first image area in the image to be detected and the corresponding first value and second value. Since the first value indicates the probability that the first image area includes the overall image, and the second value indicates the probability that the first image area includes the partial image, the customer service device can determine the overall image and the partial image of the target customer in the image to be detected based on the determined probability that the first image area includes the overall image and probability that the first image area includes the partial image, thereby improving the accuracy of image detection and facilitating the subsequent assignment of worker to the target customer based on the overall image and the partial image.

A process of determining the group attribute of the target customer according to the overall image by the customer service device is described in detail below with reference to the above step 402.

Figure 10:
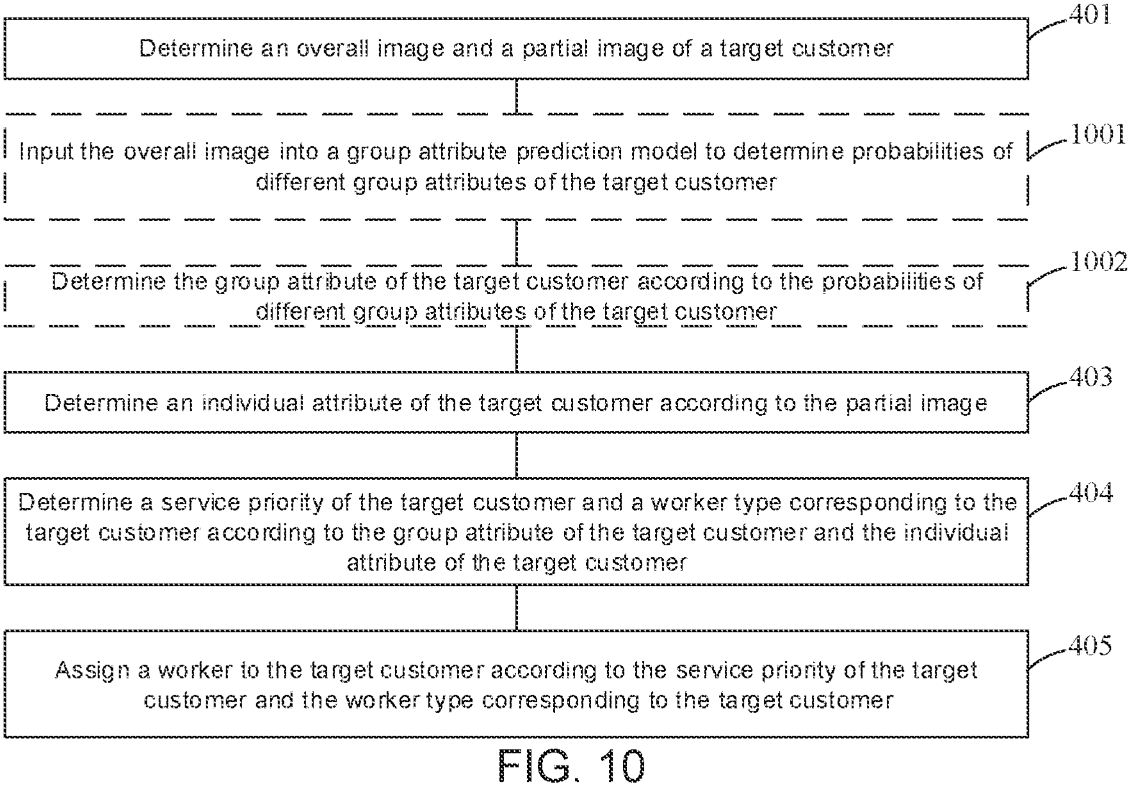
FIG. 10 is a flowchart of yet another customer service method, in accordance with some embodiments.

As a possible embodiment of the present disclosure, with reference to FIG. 4, as shown in FIG. 10, step 402 may be implemented by the following steps 1001 to 1002.

In step 1001, the customer service device inputs the overall image into a group attribute prediction model to determine probabilities of different group attributes of the target customer.

The group attribute prediction model is used to determine probabilities of different group attributes of the target customer.

For example, the group attribute prediction model may be a neural network model, e.g., an EfficientNet algorithm model or a ResNet algorithm model.

The different group attributes include at least one of mutually exclusive group attributes and independent group attributes.

It will be noted that the mutually exclusive group attributes refer to attributes corresponding to a plurality of groups that do not have an intersection. The target customer cannot have multiple group attributes in the mutually exclusive group attributes at the same time.

For example, the mutually exclusive group attributes include worker, special occupation personnel, and other personnel. The target customer may be any one of a worker, a special occupation personnel, and other personnel.

The independent group attributes refer to attributes that are independent of each other and are not affected by other group attributes.

For example, the independent group attributes include pregnant women and people with disabilities. The target customer may be a pregnant woman, or may be a person with disabilities, or may be both a pregnant woman and a person with disabilities.

In a possible implementation, the customer service device inputs the overall image into the group attribute prediction model to obtain probability factors of different group attributes.

The probability factor is used to characterize a degree of credibility that the target customer has the group attribute.

The customer service device determines the probabilities of different group attributes of the target customer according to the probability factors of different group attributes.

For example, in a case where the different group attributes include the mutually exclusive group attributes, the customer service device inputs probability factors of the mutually exclusive group attributes into the Softmax function to obtain probabilities of the mutually exclusive group attributes.

The Softmax function satisfies the following formula 2:

$$p_i = \frac{e^{v_i}}{\sum_{j=1}^{k} e^{v_j}} \qquad \text{Formula 2}$$

Where $p_i$ is a probability of an ith attribute in the mutually exclusive group attributes, $v_i$ is a probability factor of the ith attribute in the mutually exclusive group attributes, and $v_j$ is a probability factor of a jth attribute in the mutually exclusive group attributes.

Through the above formula 2, the customer service device converts the probability factor of the mutually exclusive group attribute into a non-negative number by using an exponential function with the natural constant e as the base number, moreover, the customer service device uses the converted probability factor of the i-th mutually exclusive group attribute as a numerator, and uses the sum of the converted probability factors of each attribute in the mutually exclusive group attributes as the denominator, to obtain the probability of the i-th mutually exclusive group attribute.

For example, the probability factor of the mutually exclusive group attribute 1 is 0.5, the probability factor of the mutually exclusive group attribute 2 is 2, and the probability factor of the mutually exclusive group attribute 3 is 3. The converted probability factor of the mutually exclusive group attribute 1 is 1.648721, the converted probability factor of the mutually exclusive group attribute 2 is 7.389056, and the converted probability factor of the converted mutually exclusive group attribute 3 is 20.085537. Therefore, the obtained probability of the mutually exclusive group attribute 1 is 5.6612%, the obtained probability of the mutually exclusive group attribute 2 is 25.3716%, and the obtained probability of the mutually exclusive group attribute 3 is 68.9672%.

In a case where the different group attributes include independent group attributes, the customer service device inputs the probability factors of the independent group attributes into the Sigmoid function to obtain the probabilities of the independent group attributes.

The Sigmoid function satisfies the following formula 3:

$$S(x) = \frac{1}{1+e^{-x}} \qquad \text{Formula 3}$$

Where x is a probability factor of any attribute in the independent group attributes, and S(x) is a probability of the attribute.

For example, the probability factor of the independent group attribute 1 is 3, the probability factor of the independent group attribute 2 is 2, and the probability factor of the independent group attribute 3 is 4. Therefore, the obtained probability of the independent group attribute 1 is 95.2574%, the obtained probability of the independent group attribute 2 is 88.0797%, and the obtained probability of the independent group attribute 3 is 98.2014%.

In step 1002, the customer service device determines the group attribute of the target customer according to the probabilities of different group attributes of the target customer.

In a possible implementation, in a case where the different group attributes include mutually exclusive group attributes, the customer service device determines that the group attribute of the target customer includes a first mutually exclusive group attribute.

The first mutually exclusive group attribute is a group attribute with a highest probability in the mutually exclusive group attributes.

It will be noted that the probabilities of the mutually exclusive group attributes influence each other. The larger the probability value of one group attribute in the mutually exclusive group attributes, the smaller the probability value of another group attribute in the mutually exclusive group attributes. The sum of the probabilities of the mutually exclusive group attributes is 100%.

With reference to the example in step 1001, the probability of the mutually exclusive group attribute 1 is 5.6612%, the probability of the mutually exclusive group attribute 2 is 25.3716%, and the probability of the mutually exclusive group attribute 3 is 68.9672%. Then, the customer service device determines that the group attribute of the target customer includes the mutually exclusive group attribute 3.

In another possible implementation, in a case where the different group attributes include independent group attributes, the customer service device determines that the group attribute of the target customer includes a first independent group attribute.

The first independent group attribute is a group attribute whose probability is greater than an attribute probability threshold in the independent group attributes.

It will be noted that the probability of an independent group attribute is only related to the independent group attribute, and is irrelevant to other independent group attributes. The target customer may have one or more group attributes in the independent group attributes at the same time.

With reference to the example in step 1001, the attribute probability threshold is set to 90%. The probability of the independent group attribute 1 is 95.2574%, the probability of the independent group attribute 2 is 88.0797%, and the probability of the independent group attribute 3 is 98.2014%. Therefore, the customer service device determines that the group attributes of the target customer include both the independent group attribute 1 and the independent group attribute 3.

Based on the above technical solution, the customer service device can input the overall image into the group attribute prediction model to determine probabilities of different group attributes, so as to determine the group attribute of the target customer according to the probabilities of different group attributes, which facilitates the subsequent assignment of the worker for the target customer. In addition, the different group attributes include at least one of mutually exclusive group attributes and independent group attributes, and the probabilities of the mutually exclusive group attributes influence each other and the probability of an independent group attribute is only related to the independent group attribute itself; therefore, the customer service device in the embodiments of the present disclosure determines the probabilities of corresponding group attributes in different ways based on the group attributes, which improves the accuracy of determining the group attribute of the target customer by the customer service device, and facilitates the assignment of the worker to the target customer.

A process of determining the individual attribute of the target customer according to the partial image by the customer service device will be described in detail below with reference to step 403.

Figure 11:
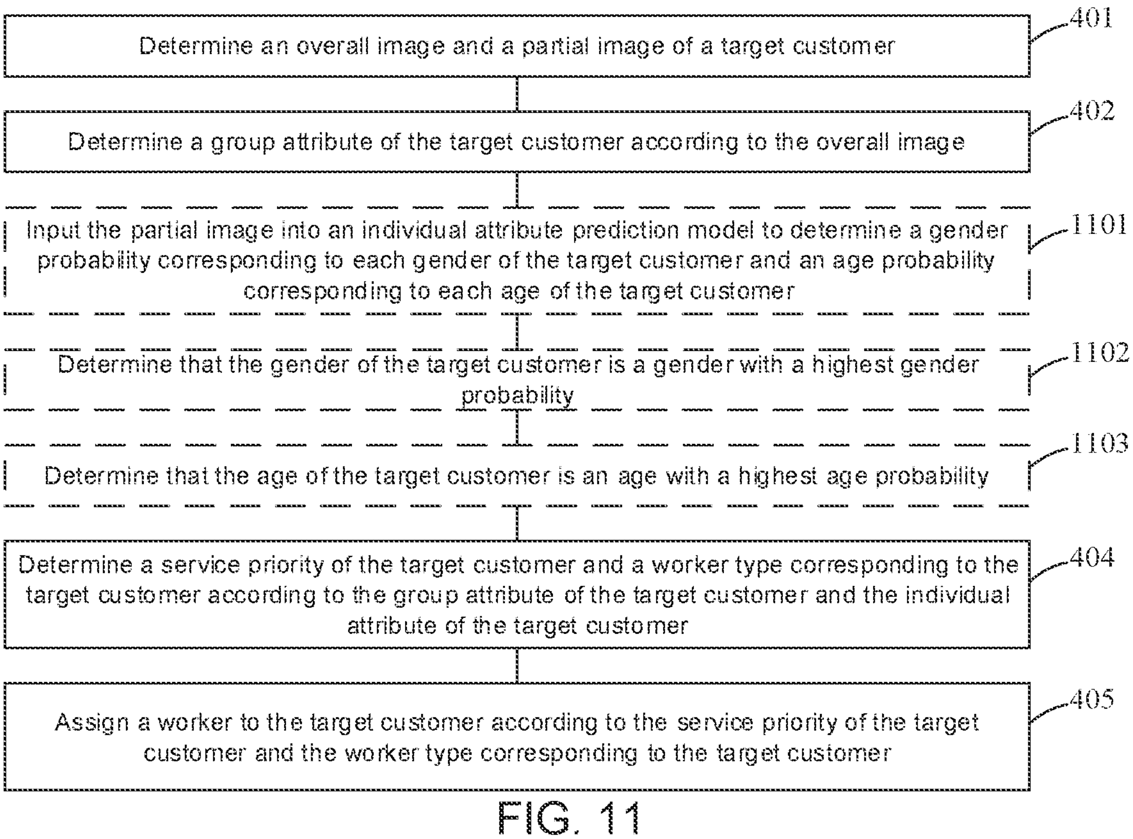
FIG. 11 is a flowchart of yet another customer service method, in accordance with some embodiments.

As a possible embodiment of the present disclosure, with reference to FIG. 4, as shown in FIG. 11, step 403 may be implemented by the following steps 1101 to 1103.

In step 1101, the customer service device inputs the partial image into an individual attribute prediction model to determine a gender probability corresponding to each gender of the target customer and an age probability corresponding to each age of the target customer.

The individual attribute prediction model is used to determine the gender probability corresponding to each gender of the target customer and the age probability corresponding to each age of the target customer.

For example, the individual attribute prediction model may be a neural network model, e.g., a ShuffleNet algorithm model or a ResNet algorithm model.

Since the gender attribute is also a mutually exclusive attribute, similar to the above mutually exclusive group attributes, the customer service device may determine the gender of the target customer by using a Softmax function. As for a specific implementation manner, reference may be made to related descriptions above, and details are not repeated here.

As for the age attribute, since a lot of age probabilities need to be determined, the customer service device may use the L1 norm to regress age features extracted from the individual attribute prediction model, so as to obtain the age probability corresponding to each age of the target customer.

In step 1102, the customer service device determines that the gender of the target customer is a gender with a highest gender probability.

For example, the probability that the gender of the target customer is male is 40%, and the probability that the gender of the target customer is female is 60%; therefore, the customer service device determines that the gender of the target customer is female.

In step 1103, the customer service device determines that the age of the target customer is an age with a highest age probability.

The manner in which the customer service device determines the age of the target customer is similar to the above manner of determining the gender, and details are not repeated here.

Based on the above technical solution, the customer service device can input the partial image into the individual attribute prediction model to determine the individual attribute of the target customer, for example, the gender and age of the target customer. In the meantime, for different individual attributes, the customer service device determines the probabilities of corresponding individual attributes in different ways, and determines the individual attribute of the target customer based on the attribute probabilities, which improves the accuracy of determining the individual attribute of the target customer by the customer service device, and facilitates the subsequent assignment of the worker for the target customer.

A process of determining the individual attribute of the target customer according to the partial image by the customer service device will be described in detail below with reference to step 403.

Figure 12:
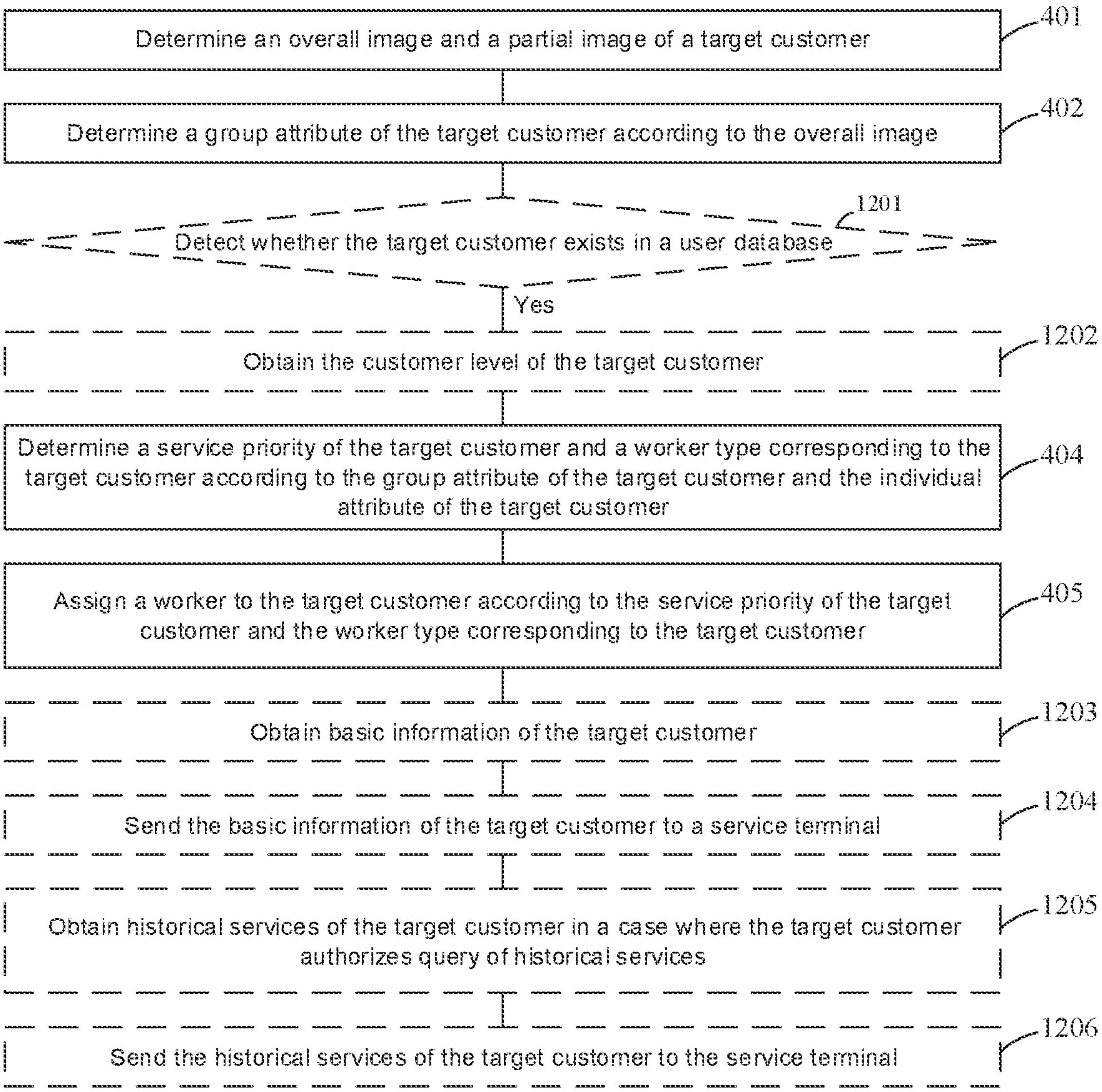
FIG. 12 is a flowchart of yet another customer service method, in accordance with some embodiments.

As another possible embodiment of the present disclosure, with reference to FIG. 4, as shown in FIG. 12, the above step 403 includes the following steps 1201 to 1202.

In step 1201, the customer service device detects whether the target customer exists in a user database according to the partial image of the target customer.

The user database stores the user information of the user in advance, for example, information such as a partial image, a customer level, a gender, an age, and historical services of the user.

The customer service device may match the determined partial image of the target customer to the partial image of each user in the user database, so as to detect whether the target customer exists in the user database.

In a possible implementation, the customer service device inputs the partial image of the target customer and the partial images of all users in the user database into a partial image recognition model to obtain partial image features of partial images.

The customer service device determines the image similarity between the target customer and each user according to the partial image feature of the target customer and the partial image feature of each user in the user database.

In a case where a first image similarity is greater than a preset similarity threshold, the customer service device determines that the target customer is the user corresponding to the first image similarity.

In still another possible implementation, the image feature of the partial image of each user may be stored in the user database in advance.

In this way, the customer service device may directly obtain the image feature of the partial image of each user from the user database, which improves the detection efficiency.

For example, the customer service device may determine the image similarity between the target customer and each user by calculating the cosine distance between the partial image feature of the target customer and the partial image feature of each user in the user database.

In step 1202, in a case where the target customer exists in the user database, the customer service device obtains the customer level of the target customer.

For example, the customer levels may be classified into a plurality of levels, e.g., level 1 customer, level 2 customer, and level 3 customer. The customer levels may also be classified according to customer categories, e.g., VIP customer and non-VIP customer. The present disclosure is not limited thereto.

Based on the above technical solution, the customer service device can detect the corresponding user from the user database according to the partial image of the target customer, so as to obtain more detailed user information of the target customer. As a result, the customer service device may assign a more suitable worker to the target customer in a subsequent step.

As another possible embodiment of the present disclosure, with reference to FIG. 4, as shown in FIG. 12, the method further includes the following steps 1203 to 1206.

In step 1203, in a case where the target customer exists in the user database, the customer service device obtains basic information of the target customer.

For example, the basic information may include gender, age, contact information, and service related information. The service-related information is determined according to a scenario corresponding to the target area. For example, in a case where the target area is a bank, the service-related information may be financial field service.

In step 1204, the customer service device sends the basic information of the target customer to the service terminal. Correspondingly, the service terminal receives the basic information of the target customer sent by the customer service device.

The service terminal is a terminal used by the worker.

By sending the basic information of the target customer to the assigned worker, the customer service device may help the worker understand the target customer's needs in time, so as to provide better services for the target customer.

It will be noted that, in a case where the assigned worker is a device that provides services for the target customer, the service terminal may be coupled into the device.

In step 1205, in a case where the target customer authorizes query of historical services, the customer service device obtains historical services of the target customer.

In a possible implementation, the customer service device may send a service query request to the user terminal of the target customer.

The service query request is used to confirm whether the target customer authorizes the query of historical services.

In a case where the customer service device receives the authorization message sent by the user terminal, it confirms that the target customer authorizes the query of historical services.

In another possible implementation, the authorization information of the user may be stored in the user database in advance. The customer service device determines whether the target customer authorizes the query of historical services according to the authorization information.

In step 1206, the customer service device sends the historical services of the target customer to the service terminal.

Based on the above technical solution, the customer service device can further obtain the basic information of the target customer from the user database and obtain the historical services of the target customer under the condition that the target customer authorizes the query of historical services, and send the basic information and the historical services to the service terminal of the worker. This solution not only protects the privacy data of target customer, but also helps to provide better services for the target customer.

A process of determining the service priority of the target customer and the worker type corresponding to the target customer by the customer service device is described in detail below with reference to step 404.

Figure 13:
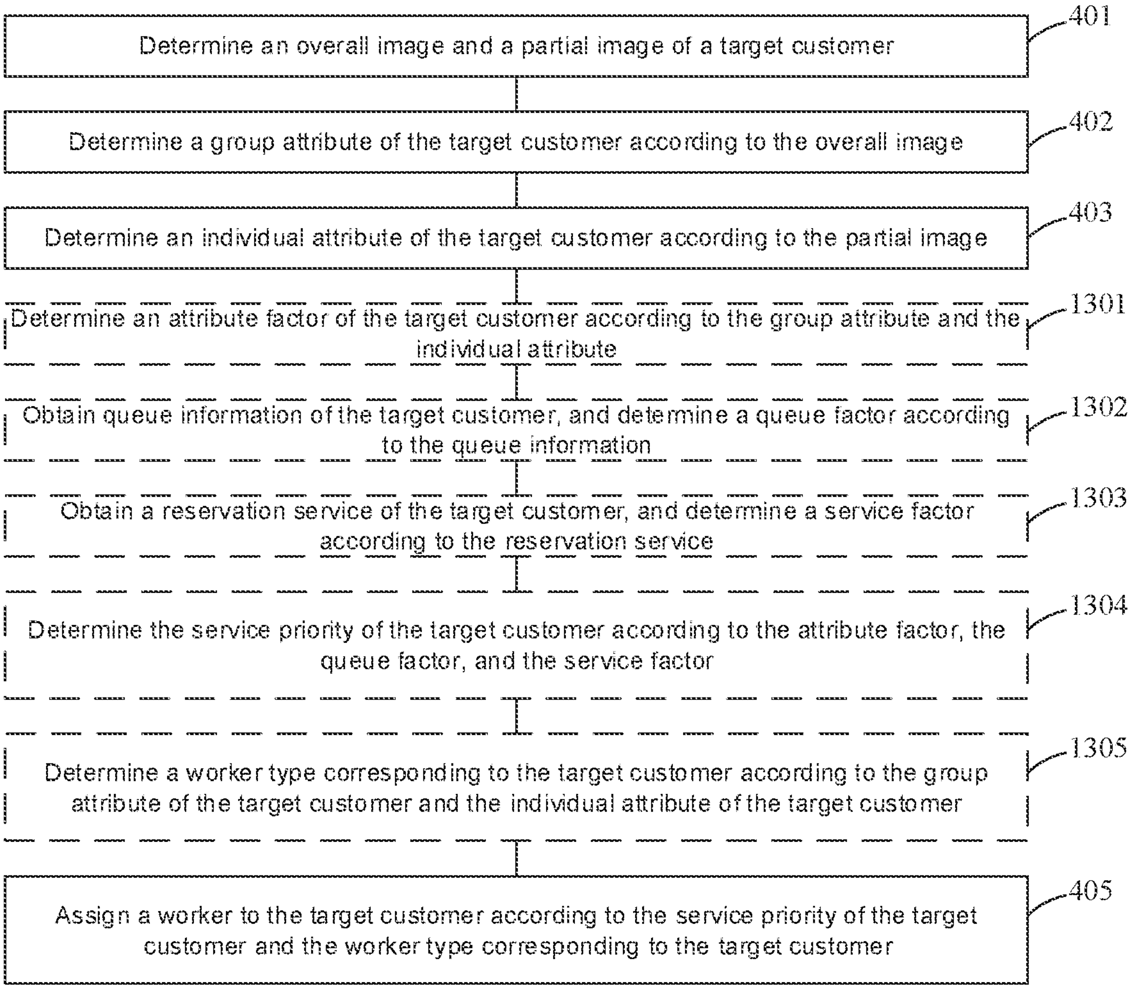
FIG. 13 is a flowchart of yet another customer service method, in accordance with some embodiments.

As a possible embodiment of the present disclosure, with reference to FIG. 4, as shown in FIG. 13, the above step 404 includes the following steps 1301 to 1305.

In step 1301, the customer service device determines an attribute factor of the target customer according to the group attribute and the individual attribute.

The attribute factor is used to indicate a degree of influence of an attribute of the target customer on the service priority.

It will be noted that there may be one or more attribute factors of the target customer.

For example, in a case where there is one attribute factor of the target customer, the attribute factor satisfies the following formula 4:

$$S_1 = w_1 * \overline{S}_1 \quad \text{Formula 4}$$

Where $S_1$ is the attribute factor of the target customer, $w_1$ is an attribute factor weight value, and $\overline{S}_1$ is an attribute evaluation value of the target customer.

In a case where there are a plurality of attribute factors of the target customer, the attribute factor is a sum of the plurality of sub-attribute factors. Weight values corresponding to each of the plurality of sub-attribute factors may be the same value, or may be different values. The manner of determining the sub-attribute factor is the same as the above manner of determining the attribute factor in a case where there is only one attribute factor of the target customer, and details are not repeated here.

In a possible implementation, the attribute factor includes at least one of a customer level factor, a group attribute factor, and an age factor. That is, a value of the attribute factor is a sum of at least one of the customer level factor, the group attribute factor, and the age factor.

The embodiments of the present disclosure will be specifically described below by taking an example where the attribute factor includes any one of the customer level factor, the group attribute factor, and the age factor.

In a case where the attribute factor includes the customer level factor, the customer level factor is determined by the customer level evaluation value and the customer level weight value of the target customer.

For example, in a case where the customer level of the target customer is classified according to customer categories, if the customer level of the target customer is VIP customer, the customer level evaluation value of the target customer is 1; if the customer level of the target customer is non-VIP customer, the customer level evaluation value of the target customer is 0.

In a case where the attribute factor includes the group attribute factor, the group attribute factor is determined by the group attribute evaluation value and the group attribute weight value of the target customer.

It will be noted that there may be one or more group attributes of the target customer. In a case where there is only one group attribute of the target customer, the implementation manner is the same as that of the customer level factor, and details are not repeated here.

In a case where there are a plurality of group attributes of the target customer, a first group attribute factor of each group attribute may be determined separately, and the sum of the first group attribute factors of each group attribute may be used as the group attribute factor of the target customer.

The group attribute weight value corresponding to each group attribute may be the same value or different values. The manner of determining, by the customer service device, the first group attribute factor of each group attribute is the same as the above determination manner in the case where there is only one group attribute of the target customer, and details are not repeated here.

For example, in a case where the group attribute of the target customer includes pregnant woman, the customer service device determines that the group attribute factor of the target customer is the group attribute factor corresponding to pregnant woman. In a case where the group attributes of the target customer include pregnant woman and people with disabilities, the customer service device determines that the group attribute factor of the target customer is a sum of the first group attribute factor corresponding to pregnant woman and the first group attribute factor corresponding to people with disabilities.

It will be noted that, the implementation manner of determining the group attribute factor is only illustrated above by taking an example where the group attributes include pregnant woman and people with disabilities, and the group attributes in the embodiments of the present disclosure may further include other attributes, which may be set according to actual situations.

In a case where the attribute factor includes the age factor, the age factor is determined by the age evaluation value and the age weight value of the target customer.

Figure 14:
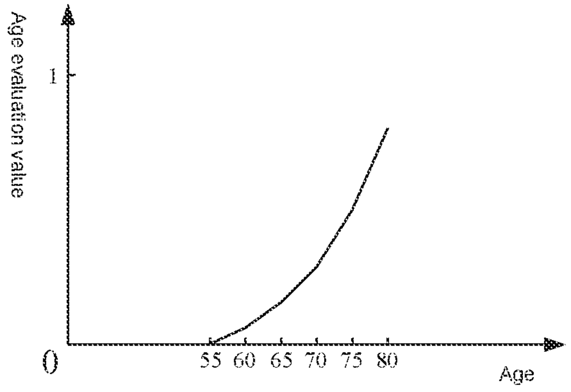
FIG. 14 is a function diagram of an age evaluation value and an age, in accordance with some embodiments.

For example, the age evaluation value of the target customer may be determined by using a piecewise function, e.g., the function graph of age evaluation value and age as shown in FIG. 14. The age evaluation value of the target customer may also be determined by a curve function. The present disclosure is not limited thereto.

In step 1302, the customer service device obtains queue information of the target customer, and determines a queue factor according to the queue information.

The queue factor is used to indicate a degree of influence of the queue information of the target customer on the service priority.

In a possible implementation, the target customer may perform reservation service registration through a user registration device provided in the target area, and the customer service device obtains the queue information of the target customer from the user registration device. The target customer may also remotely reserve the service through the user terminal, and the customer service device receives the reservation service information sent by the user terminal, and determines the queue information of the target customer according to the reservation service information.

The queue factor is determined by the queue information evaluation value and the queue information weight value of the target customer.

For example, the queue factor satisfies the following formula 5:

$$S_2 = w_2 * \overline{S}_2 \quad \text{Formula 5}$$

Where $S_2$ is the queue factor of the target customer, $w_2$ is the queue information weight value, and $\overline{S}_2$ is the queue information evaluation value of the target customer.

In a possible implementation, the customer service device may update the queue information evaluation value in real time according to the queue information of the target customer, so as to determine the queue factor of the target customer.

For example, the queue information evaluation value satisfies the following formula 6:

$$\overline{S}_2 = \frac{1}{N} \quad \text{Formula 6}$$

Where $\overline{S}_2$ is the queue information evaluation value of the target customer, and N is a queuing order in the queue information of the target customer.

That is, the smaller the queuing order of the target customer (i.e., the earlier the target customer queues up), the greater the queue information evaluation value of the target customer.

In still another possible implementation, the customer service device may further determine an estimated waiting time of the target customer based on the queue information of the target customer, and send the estimated waiting time to the user terminal of the target customer, so that the target customer knows the current situation in time.

In step 1303, the customer service device obtains a reservation service of the target customer, and determines a service factor according to the reservation service.

The service factor is used to indicate a degree of influence of the reservation service of the target customer on the service priority.

In a possible implementation, the customer service device may obtain the reservation service of the target customer from the user registration device or the user terminal of the target customer. With regard to this, reference may be made to the related description in step 1302, and details are not repeated here.

The service factor is determined by the reservation service evaluation value and the reservation service weight value of the target customer.

For example, the service factor satisfies the following formula 7:

$$S_3 = w_3 * \overline{S}_3 \quad \text{Formula 7}$$

Where $S_3$ is the service factor of the target customer, $w_3$ is the reservation service weight value, and $\overline{S}_3$ is the reservation service evaluation value of the target customer.

The reservation service evaluation value is related to the level of the reservation service. The higher the level of the reservation service, the greater the reservation service evaluation value; and conversely, the lower the level of the reservation service, the less the reservation service evaluation value.

In step 1304, the customer service device determines the service priority of the target customer according to the attribute factor, the queue factor, and the service factor.

For example, the service priority satisfies the following formula 8:

$$S = S_1 + S_2 + S_3 \quad \text{Formula 8}$$

Where S is the service priority of the target customer, $S_1$ is the attribute factor of the target customer, $S_2$ is the queue factor of the target customer, and $S_3$ is the service factor of the target customer.

In step 1305, the customer service device determines the worker type corresponding to the target customer according to the group attribute of the target customer and the individual attribute of the target customer.

For a specific implementation manner of this step, reference may be made to the related description in steps 404 to 405, and details are not repeated here.

Based on the above technical solution, the customer service device can determine the attribute factor, the queue factor, and the service factor of the target customer separately, and determine the service priority of the target customer according to the attribute factor, the queue factor, and the service factor, so as to assign a corresponding worker to the target customer in the priority order of the service priority. In this way, the customer service device may arrange the target customers in order according to three dimensions, i.e., the attribute of the target customer, the current queuing status, and the type of service needed, so that the customer service device assigns the workers more reasonably, and the service experience of different target customers is ensured.

A process of the customer service device determining the route trajectory of the target customer and determining the service concerned by the target customer is described in detail below.

Figure 15:
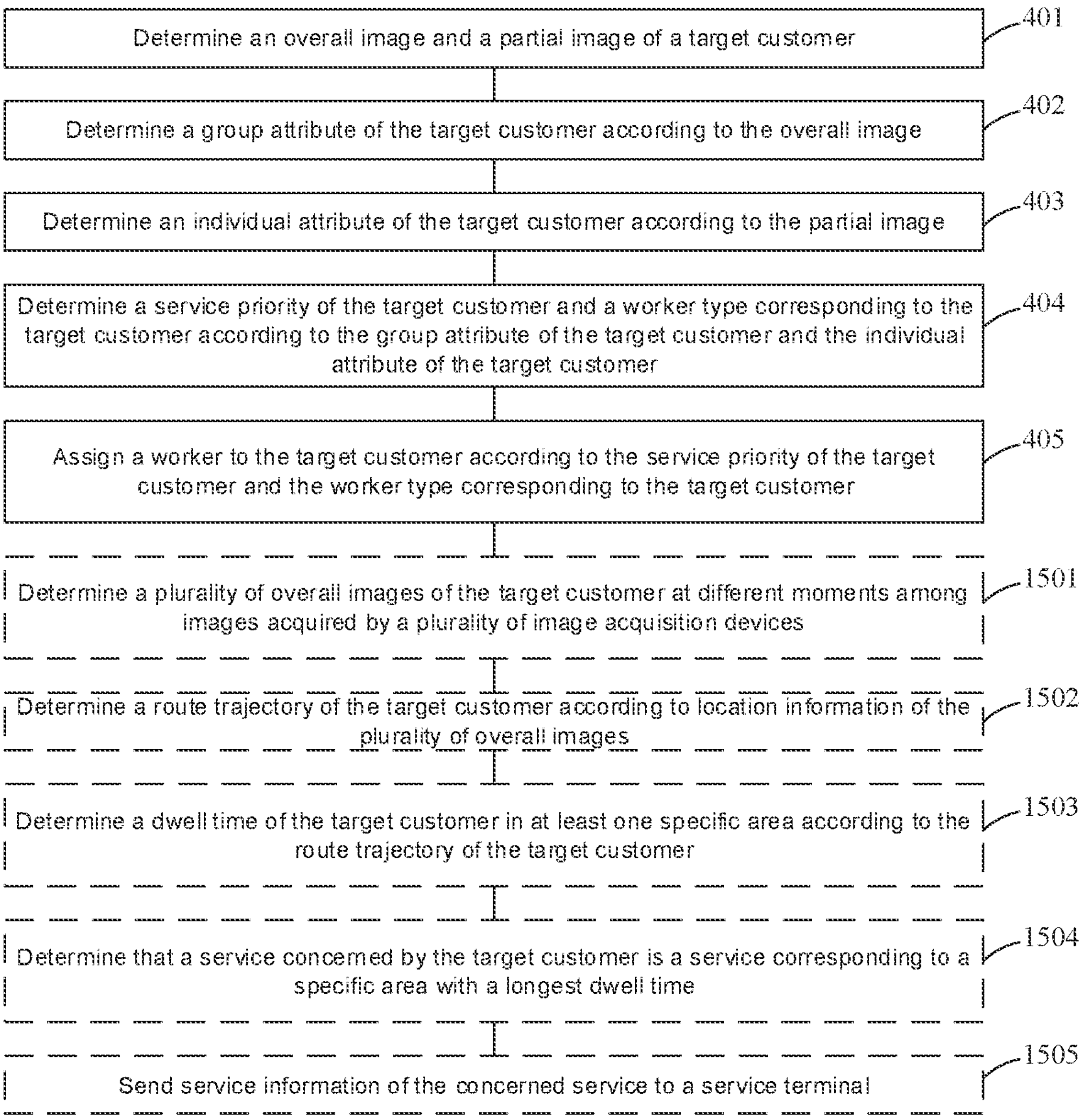
FIG. 15 is a flowchart of yet another customer service method, in accordance with some embodiments.

As a possible embodiment of the present disclosure, with reference to FIG. 4, as shown in FIG. 15, the method further includes the following steps 1501 to 1502.

In step 1501, the customer service device determines a plurality of overall images of the target customer at different moments among images acquired by a plurality of image acquisition devices.

It will be noted that since a single image acquisition device usually cannot acquire image information of each area in the target area, the customer service device detects the plurality of overall images of the target customer at different moments among the images acquired by the plurality of image acquisition devices, which is conducive to determining the route trajectory of the target customer more accurately and more comprehensively in a subsequent step.

For the image information at different moments acquired by the same image acquisition device, the customer service device may determine the overall image of the target customer through the manner in step 401, and details are not repeated here.

For the image information acquired by different image acquisition devices, first, the customer service device may determine the overall image of the target customer from the image information acquired by any one of the image acquisition devices; then, the customer service device may input the overall image into a pedestrian re-identification model, and determine the overall images of the target customer among the images acquired by the plurality of image acquisition devices.

For example, the pedestrian re-identification model may be a multiple granularity network (MGN) model. The pedestrian re-identification model may also be a model for pedestrian detection, which is not limited in the present disclosure.

It will be noted that, there may be some deviations in the plurality of overall images of the target customers at different moments determined by the customer service device in the above manner. Therefore, the customer service device may also correct the position of the overall image according to the detected overall image of the target customer.

In a possible implementation, the customer service device corrects location information of the overall image of the target customer detected at a next moment according to location information of the overall image of the target customer at a current moment, so as to obtain the predicted overall image of the target customer at the next moment.

For example, the customer service device may track the overall image of the target customer through the SORT algorithm. The customer service device performs Kalman filtering on the detected overall image of the target customer to estimate the motion state of the target customer, and then performs position matching through the Hungarian matching algorithm, so as to obtain a plurality of corrected overall images of the target customer at different moments.

In step 1502, the customer service device determines the route trajectory of the target customer according to location information of the plurality of overall images.

Figure 16:
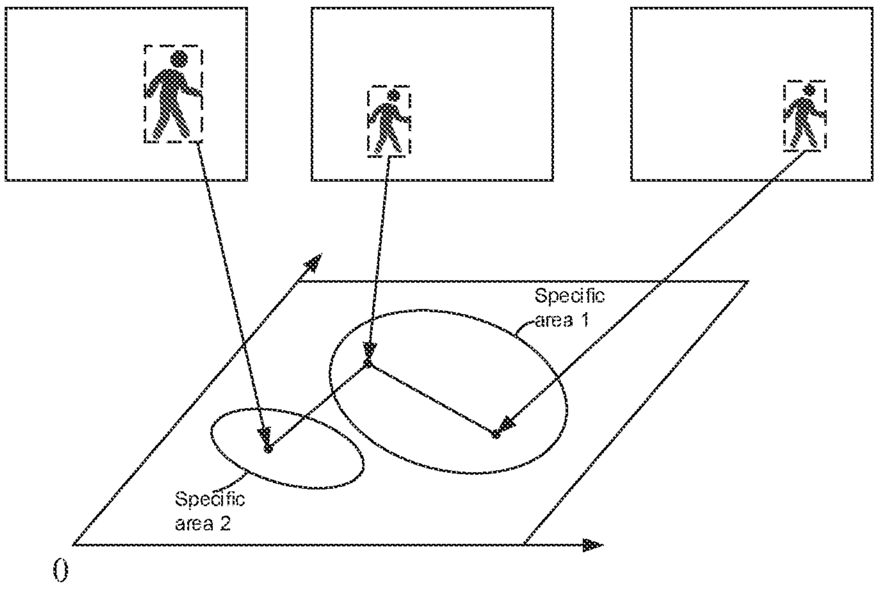
FIG. 16 is a mapping diagram of an overall image in a target area, in accordance with some embodiments.

For example, as shown in FIG. 16, the customer service device may map the plurality of overall images into a coordinate system corresponding to the target area, so as to obtain the coordinates corresponding to each overall image. The customer service device connects each pair of coordinates in chronological order to obtain the route trajectory of the target customer.

In a possible implementation, the customer service device may further determine an image of a target article, and determine whether the target customer has lost the article by detecting the route trajectories of the target article and the target customer.

For example, in a case where the determined distance between the target article and the target customer is greater than a preset threshold and a duration thereof exceeds a certain limit, the customer service device detects a relationship between the route trajectories of the target article and the target customer. In a case where the distance between the target article and the target customer is less than the preset threshold and a duration thereof exceeds the certain limit, it is determined that the target article belongs to the target customer and the target customer has lost the article.

Based on the above technical solution, the customer service device can obtain the plurality of overall images of the target customer at different moments from the plurality of image acquisition devices to determine the route trajectory of the target customer according to the location information corresponding to the plurality of overall images, so as to subsequently analyze relevant services concerned by the target customer according to the route trajectory of the target customer, and thereby recommend relevant services for the target customer. At the same time, the customer service device may further guide the worker to find the target customer to be served in time according to the location information of the overall image, so as to provide services more quickly.

As a possible embodiment of the present disclosure, with reference to FIG. 4, as shown in FIG. 15, after step 1502, the method further includes the following steps 1503 to 1505.

In step 1503, the customer service device determines a dwell time of the target customer in at least one specific area according to the route trajectory of the target customer.

The at least one specific area corresponds to at least one service. The specific area may be set according to actual situations, which is not limited in the present disclosure.

It will be noted that, as shown in FIG. 16, the customer service device may use the time period corresponding to the route trajectory of the target customer in the specific area as the dwell time of the target customer in the specific area. Since each specific area corresponds to one service, the dwell time of the target customer in the specific area may characterize an extent to which the target customer is concerned about the service corresponding to this specific area.

In step 1504, the customer service device determines that a service concerned by the target customer is a service corresponding to a specific area with a longest dwell time.

As can be seen from the above, the dwell time of the target customer in a specific area may characterize an extent to which the target customer is concerned about the service corresponding to this specific area. Therefore, the customer service device may use the service corresponding to the specific area with the longest dwell time as the service concerned by the target customer, and obtain the service information of the service.

In step 1505, the customer service device sends service information of the concerned service to the service terminal.

Based on the above technical solution, the customer service device can analyze the service concerned by the target customer according to the route trajectory of the target customer, and send the service information of the service to the service terminal of the assigned worker, so that the worker provides services for the target customer in a targeted manner. In this way, the service experience of the target customer may be improved.

In the embodiments of the present disclosure, the customer service device may be divided into functional modules or functional units according to the above method examples. For example, the customer service device may be divided into functional modules or functional units according to respective functions; or two or more functions may be integrated into one processing module. The integrated module may be implemented in the form of hardware, or may be implemented in the form of a software functional module or afunctional unit. The division of modules or units in the embodiments of the present disclosure is schematic, and is merely a logical functional division, and there may be other division manners in actual implementation.

Figure 17:
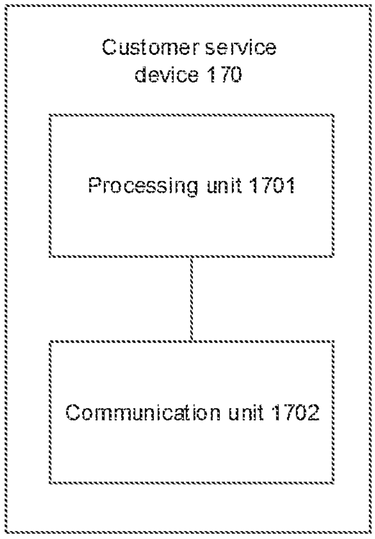
FIG. 17 is a structural diagram of another customer service device, in accordance with some embodiments.

FIG. 17 is a schematic structural diagram of a customer service device 170 according to some embodiments. The device includes:

a processing unit 1701 configured to determine an overall image and a partial image of the target customer.

The processing unit 1701 is further configured to determine a group attribute of the target customer according to the overall image.

The group attribute is used to characterize a type of a group to which the target customer belongs.

The processing unit 1701 is further configured to determine an individual attribute of the target customer according to the partial image.

The individual attribute includes at least one of gender, age, and customer level.

The processing unit 1701 is further configured to determine a service priority of the target customer and a worker type corresponding to the target customer according to the group attribute of the target customer and the individual attribute of the target customer.

The processing unit 1701 is further configured to assign a worker to the target customer according to the service priority of the target customer and the worker type corresponding to the target customer.

In some embodiments, the customer service device further includes a communication unit 1702. The communication unit 1702 is configured to send customer information of the target customer and current location information of the target customer to the service terminal; the processing unit 1701 is configured to determine a first location distance between the worker and the target customer according to an overall image of the worker and the overall image of the target customer; and the communication unit 1702 is further configured to send service prompt information to the service terminal in a case where the first location distance is greater than a first preset distance and a duration is greater than a first duration.

In some embodiments, the communication unit 1702 is configured to receive registration information of the target customer, the registration information including the partial image of the target customer and a partial image of a companion of the target customer.

In some embodiments, the processing unit 1701 is configured to determine an overall image of the companion based on the partial image of the companion; the processing unit 1701 is configured to determine a second location distance between the target customer and the companion according to the overall image of the target customer and the overall image of the companion; and the processing unit 1701 is configured to, in a case where the second location distance is greater than a second preset distance, assign the worker to the target customer according to the service priority of the target customer and the worker type corresponding to the target customer.

In some embodiments, the processing unit 1701 is configured to determine a target worker group, a type of the target worker group being the worker type corresponding to the target customer, and the target worker group including a plurality of target workers; the processing unit 1701 is further configured to determine a worker priority of the target worker group according to a worker attribute of the target worker group; and the processing unit 1701 is further configured to assign the target worker to the target customer according to the service priority of the target customer and the worker priority of the target worker group.

In some embodiments, the communication unit 1702 is configured to obtain an image to be detected, the image to be detected including the target customer; the processing unit 1701 is configured to determine a first image area in the image to be detected, and a first value and a second value corresponding to the first image area, the first value indicating a probability that the first image area includes the overall image, the second value indicating a probability that the first image area includes the partial image, and the first image area is any area in the image to be detected; the processing unit 1701 is configured to determine that the first image area includes the overall image of the target customer in a case where the first value is greater than a first threshold; and the processing unit 1701 is configured to determine that the first image area includes the partial image of the target customer in a case where the second value is greater than a second threshold.

In some embodiments, the processing unit 1701 is configured to input the overall image into a group attribute prediction model to determine probabilities of different group attributes of the target customer; and the processing unit 1701 is configured to determine the group attribute of the target customer according to the probabilities of different group attributes of the target customer.

In some embodiments, the different group attributes include at least one of mutually exclusive group attributes and independent group attributes; the processing unit 1701 is configured to, in a case where the different group attributes include the mutually exclusive group attributes, determine that the group attribute of the target customer includes a first mutually exclusive group attribute, the first mutually exclusive group attribute being a group attribute with a largest probability in the mutually exclusive group attribute; the processing unit 1701 is configured to, in a case where the different group attributes include independent group attributes, determine that the group attribute of the target customer includes a first independent group attribute, the first independent group attribute being a group attribute whose probability is greater than an attribute probability threshold in the independent group attributes.

In some embodiments, the processing unit 1701 is configured to input the partial image into an individual attribute prediction model to determine a gender probability corresponding to each gender of the target customer and an age probability corresponding to each age of the target customer; the processing unit 1701 is configured to determine that the gender of the target customer is a gender with a highest gender probability; and the processing unit 1701 is configured to determine that the age of the target customer is an age with a highest age probability.

In some embodiments, the processing unit 1701 is configured to detect whether the target customer exists in a user database according to the partial image of the target customer; and the communication unit 1702 is configured to obtain the customer level of the target customer in a case where the target customer exists in the user database.

In some embodiments, the communication unit 1702 is configured to obtain basic information of the target customer in a case where the target customer exists in the user database; the communication unit 1702 is configured to send the basic information of the target customer to the service terminal, the service terminal being a terminal used by the worker, the communication unit 1702 is configured to obtain historical services of the target customer in a case where the target customer authorizes query of historical services; and the communication unit 1702 is configured to send the historical services of the target customer to the service terminal.

In some embodiments, the processing unit 1701 is configured to determine an attribute factor of the target customer according to the group attribute and the individual attribute, the attribute factor being used to indicate a degree of influence of an attribute of the target customer on the service priority; the processing unit 1701 is configured to obtain queue information of the target customer, and determine a queue factor according to the queue information, the queue factor being used to indicate a degree of influence of the queue information of the target customer on the service priority; the processing unit 1701 is configured to obtain a reservation service of the target customer, and determine a service factor according to the reservation service, the service factor being used to indicate a degree of influence of the reservation service of the target customer on the service priority; and the processing unit 1701 is configured to determine the service priority of the target customer according to the attribute factor, the queue factor, and the service factor.

In some embodiments, the processing unit 1701 is configured to determine a plurality of overall images of the target customer at different moments among images acquired by a plurality of image acquisition devices; and the processing unit 1701 is configured to determine a route trajectory of the target customer according to location information of the plurality of overall images.

In some embodiments, the processing unit 1701 is configured to determine a dwell time of the target customer in at least one specific area according to the route trajectory of the target customer, the at least one specific area corresponding to at least one service; the processing unit 1701 is configured to determine that a service concerned by the target customer is a service corresponding to a specific area with a longest dwell time; and the communication unit 1702 is configured to send service information of the concerned service to the service terminal.

When implemented in the form of hardware, the communication unit 1702 in the embodiments of the present disclosure may be integrated in a communication interface, and the processing unit 1701 may be integrated in a processor. The specific implementation manner is shown in FIG. 18.

Figure 18:
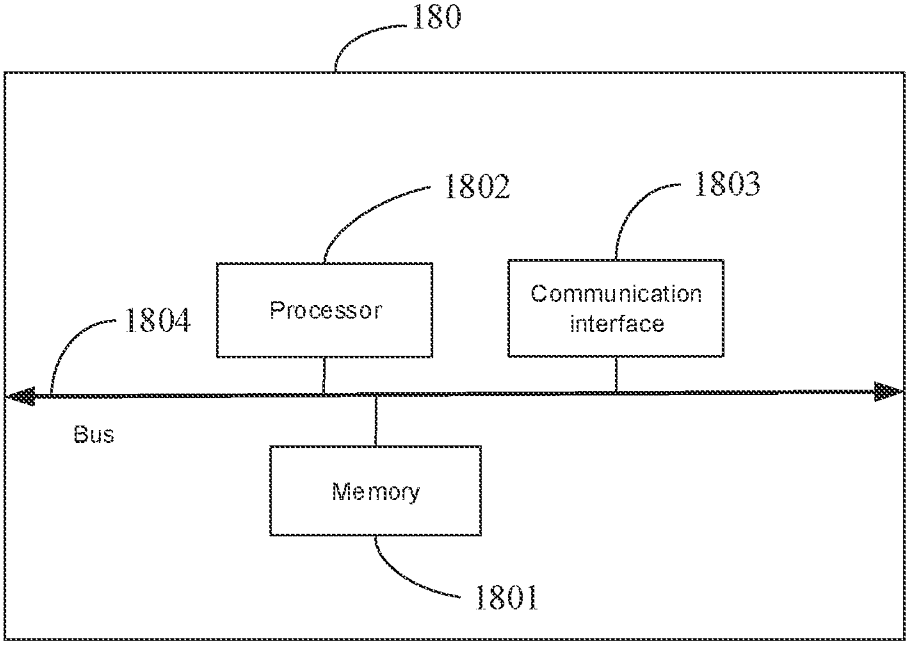
FIG. 18 is a structural diagram of yet another customer service device, in accordance with some embodiments.

FIG. 18 is another possible schematic structural diagram of a customer service device involved in the foregoing embodiments. The customer service device 180 includes a processor 1802 and a communication interface 1803. The processor 1802 is configured to control the actions of the customer service device 180, for example, perform the above steps performed by the processing unit 1701, and/or configured to perform other processes of the techniques described herein. The communication interface 1803 is configured to support communication between the customer service device 180 and other network entities, for example, to perform the above steps performed by the communication unit 1702. The customer service device 180 may further include a memory 1801 and a bus 1804, and the memory 1801 is configured to store program codes and data of the customer service device 180.

The memory 1801 may be a memory in the customer service device 180. The memory may include a volatile memory, such as a random access memory. The memory may also include a non-volatile memory, such as a read-only memory, a flash memory, a hard disk, or a solid state disk. The memory may further include a combination of the foregoing types of memories.

The processor 1802 may implement or execute the various illustrative logical blocks, modules and circuits described in connection with the embodiments of the present disclosure. The processor may be a central processing unit, a general-purpose processor, a digital signal processor, an application-specific integrated circuit, a field programmable gate array or other programmable logic device, a transistor logic device, a hardware component, or any combination thereof. The processor may alternatively be a combination of computing functions, for example, a combination of one or more microprocessors, a combination of a DSP and a microprocessor, and the like.

The bus 1804 may be an extended industry standard architecture (EISA) bus. The bus 1804 may be classified into an address bus, a data bus, a control bus, and the like. For ease of illustration, the bus is indicated by only one bold line in FIG. 18, but it does not mean that there is only one bus or one type of bus.

The customer service device 180 in FIG. 18 may also be a chip. The chip includes one or more (including two) processors 1802 and a communication interface 1803.

In some embodiments, the chip further includes a memory 1801. The memory 1801 may include a read-only memory and a random access memory, and provide operation instructions and data to the processor 1802. A part of the memory 1801 may further include a non-volatile random access memory (NVRAM).

In some embodiments, the memory 1801 stores the following elements, execution modules or data structures, or their subsets, or their extended sets.

In the embodiments of the present disclosure, corresponding operations are performed by calling the operation instructions stored in the memory 1801 (the operation instructions may be stored in an operating system).

Through the description of the above embodiments, those skilled in the art will clearly understand that, for the convenience and brevity of description, only the above division of functional modules is illustrated for description. In actual application, the functions may be assigned to and completed by different functional modules as required. That is, the internal structure of the device is divided into different functional modules to complete all or some of the functions described above. For a specific working process of the system, device, and unit described above, reference may be made to the corresponding process in the foregoing method embodiments, and details are not repeated here.

Some embodiments of the present disclosure provide a computer readable storage medium (e.g., a non-transitory computer readable storage medium). The computer readable storage medium stores computer program instructions that, when run on a computer (e.g., the customer service device), cause the computer to perform the customer service method as described in any one of the above embodiments.

For example, the computer-readable storage medium may include, but is not limited to, a magnetic storage device (e.g., a hard disk, a floppy disk, a magnetic tape, or the like), an optical disk (e.g., a compact disc (CD), a digital versatile disc (DVD), or the like), a smart card, and a flash memory device (e.g., an erasable programmable read-only memory (EPROM), a card, a stick, or a key driver). Various computer-readable storage media described in the embodiments of the present disclosure may represent one or more devices and/or other machine-readable storage media that are used for storing information. The term "machine-readable storage medium" may include, but is not limited to, wireless channels and various other media capable of storing, containing and/or carrying instructions and/or data.

Some embodiments of the present disclosure further provide a computer program product. For example, the computer program product is stored on a non-transitory computer-readable storage medium. The computer program product includes computer program instructions that, when executed on a computer (e.g., the customer service device), cause the computer to perform the customer service method as described in the above embodiments.

Some embodiments of the present disclosure further provide a computer program. The computer program, when executed on a computer (e.g., the customer service device), causes the computer to perform the customer service method as described in the above embodiments.

The beneficial effects of the above computer-readable storage medium, the computer program product, and the computer program are the same as the beneficial effects of the customer service method provided in some of the above embodiments, and details are not repeated here.

In the several embodiments provided in the present disclosure, it will be understood that the disclosed systems, devices, and methods may be implemented in other ways. For example, the device embodiments described above are merely illustrative. For example, the division of the units is merely a logical functional division, and there may be other division manners in actual implementation. For example, a plurality of units or components may be combined or may be integrated into another system, or some features may be ignored or not performed. In addition, the mutual coupling or direct coupling or communication connection shown or discussed herein may be an indirect coupling or communication connection through some interfaces, devices, or units, and may be electrical connection, mechanical connection, or other forms of connection.

The units described as separate components may or may not be physically separated, and the components displayed as units may or may not be physical units. That is, the units may be located in one place, or may be distributed to a plurality of network units. Some or all of the units may be selected according to actual needs to achieve the purpose of the solution in the embodiments.

In addition, the functional units in the embodiments of the present disclosure may be integrated into one processing unit; or individual units physically exist separately; or two or more units may be integrated in one unit.

The foregoing are merely specific implementations of the present disclosure, but the protection scope of the present disclosure is not limited thereto. Any changes or replacements that any person skilled in the art could conceive of within the technical scope disclosed by the present disclosure shall be included in the protection scope of the present disclosure. Therefore, the protection scope of the present disclosure shall be subject to the protection scope of the claims.

What is claimed is:

1. A customer service method applied to a customer service system, the customer service system including a customer service device and at least one image acquisition device, the customer service device being communicatively coupled to the at least one image acquisition device; the at least one image acquisition device being configured to obtain an image to be detected, the image to be detected including a target customer; the customer service device being configured to receive the image to be detected sent by the at least one image acquisition device; the method comprising:

inputting, by the customer service device, the image to be detected into a target detection model to obtain an overall image and a partial image of the target customer;

determining, by the customer service device, a group attribute of the target customer according to the overall image, the group attribute being used to characterize a type of a group to which the target customer belongs; wherein determining the group attribute of the target customer according to according to the overall image includes:

inputting, by the customer service device, the overall image into a group attribute prediction model to obtain probability factors of different group attributes of the target customer, a probability factor of a corresponding group attribute being used to characterize a degree of credibility that the target customer has the corresponding group attribute; the different group attributes include at least one of mutually exclusive group attributes and independent group attributes;

in a case where the different group attributes include the mutually exclusive group attributes, inputting, by the customer service device, probability factors of the mutually exclusive group attributes into a Softmax function to obtain probabilities of the mutually exclusive group attributes; and determining, by the customer service device, that the group attribute of the target customer includes a first mutually exclusive group attribute, the first mutually exclusive group attribute being a group attribute with a highest probability in the mutually exclusive group attributes; and in a case where the different group attributes include the independent group attributes, inputting, by the customer service device, probability factors of the independent group attributes into a Sigmoid function to obtain probabilities of the independent group attributes; and determining, by the customer service device, that the group attribute of the target customer includes a first independent group attribute, the first independent group attribute being a group attribute whose probability is greater than an attribute probability threshold in the independent group attributes;

determining, by the customer service device, an individual attribute of the target customer according to the partial image; the individual attribute including gender, age, and customer level; wherein determining the individual attribute of the target customer according to according to the partial image includes at least one of:

inputting, by the customer service device, the partial image into an individual attribute prediction model to obtain probability factors of different genders of the target customer, a probability factor of a corresponding gender being used to characterize a degree of credibility that the target customer has the corresponding gender; and determining, by the customer service device, that the gender of the target customer being a gender with a highest probability in the different genders;

using, by the customer service device, L1 norm to regress age features extracted from the individual attribute prediction model to obtain age probability corresponding to each age of the target customer; and determining, by the customer service device, that the age of the target customer is an age with a highest age probability; and detecting, by the customer service device, whether the target customer exists in a user database according to the partial image of the target customer; and obtaining, by the customer service device, the customer level of the target customer in a case where the target customer exists in the user database;

performing, by the customer service device, a correction on the group attribute of the target customer through the individual attribute of the target customer;

determining, by the customer service device, a service priority of the target customer and a worker type corresponding to the target customer according to the group attribute of the target customer and the individual attribute of the target customer; and assigning, by the customer service device, a worker to the target customer according to the service priority of the target customer and the worker type corresponding to the target customer.

2. The method according to claim 1, further comprising:

sending customer information of the target customer and current location information of the target customer to a service terminal, the service terminal being a terminal used by the worker;

determining a first location distance between the worker and the target customer according to an overall image of the worker and the overall image of the target customer; and sending service prompt information to the service terminal in a case where the first location distance is greater than a first preset distance and a duration is greater than a first duration.

3. The method according to claim 1, further comprising:

receiving registration information of the target customer, the registration information including the partial image of the target customer and a partial image of a companion of the target customer.

4. The method according to claim 3, wherein assigning the worker to the target customer according to the service priority of the target customer and the worker type corresponding to the target customer includes:

determining an overall image of the companion according to the partial image of the companion;

determining a second location distance between the target customer and the companion according to the overall image of the target customer and the overall image of the companion; and in a case where the second location distance is greater than a second preset distance, assigning the worker to the target customer according to the service priority of the target customer and the worker type corresponding to the target customer.

5. The method according to claim 1, wherein assigning the worker to the target customer according to the service priority of the target customer and the worker type corresponding to the target customer includes:

determining a target worker group, a type of the target worker group being the worker type corresponding to the target customer, and the target worker group including a plurality of target workers;

determining a worker priority of the target worker group according to a worker attribute of the target worker group; and assigning a target worker to the target customer according to the service priority of the target customer and the worker priority of the target worker group.

6. The method according to claim 1, wherein determining the overall image and the partial image of the target customer includes:

obtaining the image to be detected;

determining a first image area in the image to be detected, and a first value and a second value corresponding to the first image area, the first value indicating a probability that the first image area includes the overall image, the second value indicating a probability that the first image area includes the partial image, and the first image area being any area in the image to be detected;

determining that the first image area includes the overall image of the target customer in a case where the first value is greater than a first threshold; and determining that the first image area includes the partial image of the target customer in a case where the second value is greater than a second threshold.

7. The method according to claim 1, wherein determining the service priority of the target customer according to the group attribute of the target customer and the individual attribute of the target customer includes:

determining an attribute factor of the target customer according to the group attribute and the individual attribute, the attribute factor being used to indicate a degree of influence of an attribute of the target customer on the service priority;

obtaining queue information of the target customer, and determining a queue factor according to the queue information, the queue factor being used to indicate a degree of influence of the queue information of the target customer on the service priority;

obtaining a reservation service of the target customer, and determining a service factor according to the reservation service, the service factor being used to indicate a degree of influence of the reservation service of the target customer on the service priority; and determining the service priority of the target customer according to the attribute factor, the queue factor, and the service factor.

8. The method according to claim 1, further comprising:

determining a plurality of overall images of the target customer at different moments among images acquired by a plurality of image acquisition devices; and determining a route trajectory of the target customer according to location information of the plurality of overall images.

9. The method according to claim 8, further comprising:

determining a dwell time of the target customer in at least one specific area according to the route trajectory of the target customer, the at least one specific area corresponding to at least one service;

determining that a service concerned by the target customer is a service corresponding to a specific area with a longest dwell time; and sending service information of the concerned service to a service terminal, the service terminal being a terminal used by the worker.

10. The method according to claim 1, further comprising:

obtaining basic information of the target customer in a case where the target customer exists in the user database;

sending the basic information of the target customer to a service terminal, the service terminal being a terminal used by the worker;

obtaining historical services of the target customer in a case where the target customer authorizes query of historical services; and sending the historical services of the target customer to the service terminal.

11. A customer service system, the customer service system including a customer service device and at least one image acquisition device, the customer service device being communicatively coupled to the at least one image acquisition device; the at least one image acquisition device being configured to obtain an image to be detected, the image to be detected including a target customer; the customer service device being configured to receive the image to be detected sent by the at least one image acquisition device, the customer service device comprising a processor and a memory, wherein the memory is coupled to the processor and is used to store a computer program or instructions, and the processor is used to run the computer program or instructions to implement a customer service method; wherein the customer service method comprises:

inputting, by the customer service device, the image to be detected into a target detection model to obtain an overall image and a partial image of a target customer;

determining, by the customer service device, a group attribute of the target customer according to the overall image, the group attribute being used to characterize a type of a group to which the target customer belongs;

wherein determining the group attribute of the target customer according to according to the overall image includes:

inputting, by the customer service device, the overall image into a group attribute prediction model to obtain probability factors of different group attributes of the target customer, a probability factor of a corresponding group attribute being used to characterize a degree of credibility that the target customer has the corresponding group attribute; the different group attributes include at least one of mutually exclusive group attributes and independent group attributes;

in a case where the different group attributes include the mutually exclusive group attributes, inputting, by the customer service device, probability factors of the mutually exclusive group attributes into a Softmax function to obtain probabilities of the mutually exclusive group attributes; and determining, by the customer service device, that the group attribute of the target customer includes a first mutually exclusive group attribute, the first mutually exclusive group attribute being a group attribute with a highest probability in the mutually exclusive group attributes; and in a case where the different group attributes include the independent group attributes, inputting, by the customer service device, probability factors of the independent group attributes into a Sigmoid function to obtain probabilities of the independent group attributes; and determining, by the customer service device, that the group attribute of the target customer includes a first independent group attribute, the first independent group attribute being a group attribute whose probability is greater than an attribute probability threshold in the independent group attributes;

determining, by the customer service device, an individual attribute of the target customer according to the partial image; the individual attribute including gender, age, and customer level; wherein determining the individual attribute of the target customer according to according to the partial image includes at least one of:

inputting, by the customer service device, the partial image into an individual attribute prediction model to obtain probability factors of different genders of the target customer, a probability factor of a corresponding gender being used to characterize a degree of credibility that the target customer has the corresponding gender; and determining, by the customer service device, that the gender of the target customer being a gender with a highest probability in the different genders;

using, by the customer service device, L1 norm to regress age features extracted from the individual attribute prediction model to obtain age probability corresponding to each age of the target customer; and determining, by the customer service device, that the age of the target customer is an age with a highest age probability; and detecting, by the customer service device, whether the target customer exists in a user database according to the partial image of the target customer; and obtaining, by the customer service device, the customer level of the target customer in a case where the target customer exists in the user database;

performing, by the customer service device, a correction on the group attribute of the target customer through the individual attribute of the target customer;

determining, by the customer service device, a service priority of the target customer and a worker type corresponding to the target customer according to the group attribute of the target customer and the individual attribute of the target customer; and assigning, by the customer service device, a worker to the target customer according to the service priority of the target customer and the worker type corresponding to the target customer.

12. The customer service system according to claim 10, wherein the processor is further used to implement:

sending customer information of the target customer and current location information of the target customer to a service terminal, the service terminal being a terminal used by the worker;

determining a first location distance between the worker and the target customer according to an overall image of the worker and the overall image of the target customer; and sending service prompt information to the service terminal in a case where the first location distance is greater than a first preset distance and a duration is greater than a first duration.

13. A non-transitory computer readable storage medium, wherein the non-transitory computer readable storage medium stores instructions that, when executed on a computer, cause the computer to perform a customer service method applied to a customer service system; wherein the customer service system includes a customer service device and at least one image acquisition device, the customer service device is communicatively coupled to the at least one image acquisition device; the at least one image acquisition device is configured to obtain an image to be detected, the image to be detected includes a target customer; the customer service device is configured to receive the image to be detected sent by the at least one image acquisition device, the method comprises:

inputting, by the customer service device, the image to be detected into a target detection model to obtain an overall image and a partial image of the target customer;

determining, by the customer service device, a group attribute of the target customer according to the overall image, the group attribute being used to characterize a type of a group to which the target customer belongs; wherein determining the group attribute of the target customer according to according to the overall image includes:

inputting, by the customer service device, the overall image into a group attribute prediction model to obtain probability factors of different group attributes of the target customer, a probability factor of a corresponding group attribute being used to characterize a degree of credibility that the target customer has the corresponding group attribute; the different group attributes include at least one of mutually exclusive group attributes and independent group attributes;

in a case where the different group attributes include the mutually exclusive group attributes, inputting, by the customer service device, probability factors of the mutually exclusive group attributes into a Softmax function to obtain probabilities of the mutually exclusive group attributes; and determining, by the customer service device, that the group attribute of the target customer includes a first mutually exclusive group attribute, the first mutually exclusive group attribute being a group attribute with a highest probability in the mutually exclusive group attributes; and in a case where the different group attributes include the independent group attributes, inputting, by the customer service device, probability factors of the independent group attributes into a Sigmoid function to obtain probabilities of the independent group attributes; and determining, by the customer service device, that the group attribute of the target customer includes a first independent group attribute, the first independent group attribute being a group attribute whose probability is greater than an attribute probability threshold in the independent group attributes;

determining, by the customer service device, an individual attribute of the target customer according to the partial image; the individual attribute including gender, age, and customer level; wherein determining the individual attribute of the target customer according to according to the partial image includes at least one of:

inputting, by the customer service device, the partial image into an individual attribute prediction model to obtain probability factors of different genders of the target customer, a probability factor of a corresponding gender being used to characterize a degree of credibility that the target customer has the corresponding gender; and determining, by the customer service device, that the gender of the target customer being a gender with a highest probability in the different genders;

using, by the customer service device, L1 norm to regress age features extracted from the individual attribute prediction model to obtain age probability corresponding to each age of the target customer; and determining, by the customer service device, that the age of the target customer is an age with a highest age probability; and detecting, by the customer service device, whether the target customer exists in a user database according to the partial image of the target customer; and obtaining, by the customer service device, the customer level of the target customer in a case where the target customer exists in the user database;

performing, by the customer service device, a correction on the group attribute of the target customer through the individual attribute of the target customer;

determining, by the customer service device, a service priority of the target customer and a worker type corresponding to the target customer according to the group attribute of the target customer and the individual attribute of the target customer; and assigning, by the customer service device, a worker to the target customer according to the service priority of the target customer and the worker type corresponding to the target customer.

14. The non-transitory computer readable storage medium according to claim 13, wherein the instructions also cause the computer to perform:

sending customer information of the target customer and current location information of the target customer to a service terminal, the service terminal being a terminal used by the worker;

determining a first location distance between the worker and the target customer according to an overall image of the worker and the overall image of the target customer; and sending service prompt information to the service terminal in a case where the first location distance is greater than a first preset distance and a duration is greater than a first duration.

* * * * *